United States Patent
Baldwin et al.

(10) Patent No.: US 12,142,163 B2
(45) Date of Patent: Nov. 12, 2024

(54) SYSTEM FOR EVALUATING RADAR VECTORING APTITUDE

(71) Applicant: The MITRE Corporation, McLean, VA (US)

(72) Inventors: Keith M. Baldwin, McLean, VA (US); Kerry Hutson, McLean, VA (US); Susan M. Schultheis, McLean, VA (US)

(73) Assignee: The MITRE Corporation, McLean, VA (US)

( * ) Notice: Subject to any disclaimer, the term of this patent is extended or adjusted under 35 U.S.C. 154(b) by 941 days.

(21) Appl. No.: 16/543,267

(22) Filed: Aug. 16, 2019

(65) Prior Publication Data

US 2020/0066180 A1 Feb. 27, 2020

Related U.S. Application Data

(60) Provisional application No. 62/764,950, filed on Aug. 17, 2018.

(51) Int. Cl.
 *G09B 9/54* (2006.01)
 *G06T 13/80* (2011.01)
 (Continued)

(52) U.S. Cl.
 CPC ............... *G09B 9/54* (2013.01); *G06T 13/80* (2013.01); *G09B 9/006* (2013.01); *G09B 19/165* (2013.01);
 (Continued)

(58) Field of Classification Search
 CPC ........ G09B 9/54; G09B 9/006; G09B 19/165; G09B 5/06; G09G 5/37; G09G 2354/00;
 (Continued)

(56) References Cited

U.S. PATENT DOCUMENTS 5,200,901 A * 4/1993 Gerstenfeld ............ G01S 13/91
　　　　　　　　　　　　　　　　　　　　701/120
5,961,331 A * 10/1999 Fisch ................... G09B 19/165
　　　　　　　　　　　　　　　　　　　　434/220
(Continued)

OTHER PUBLICATIONS

Startgrid, "Endless ATC instructions", Mar. 2, 2018, https://web.archive.org/web/20180302085553/http://startgrid.blogspot.com:80/2013/11/endless-atc-instructions.html, pp. 1-21 (Year: 2018).*

*Primary Examiner* — Jack Yip
(74) *Attorney, Agent, or Firm* — Morrison & Foerster LLP

(57) ABSTRACT

The present disclosure generally relates to systems and methods for evaluating radar vectoring aptitude of an individual. An exemplary computer-implemented method comprises: displaying a graphic representation of an aircraft; displaying a predetermined shape of a plurality of predetermined shapes, wherein each of the plurality of predetermined shapes is associated with a facility type; providing an instruction for controlling the aircraft; receiving a plurality of audio inputs from a user; performing a speech-to-text analysis to each of the plurality of audio inputs to obtain a plurality of corresponding text strings; identifying, based on the plurality of corresponding text strings, a plurality of vectoring clearances associated with the aircraft; displaying an animation of the aircraft based on the plurality of vectoring clearances; and based on the plurality of vectoring clearances, calculating a facility-specific aptitude score of the user.

17 Claims, 21 Drawing Sheets

(51) Int. Cl.
*G09B 9/00* (2006.01)
*G09B 19/16* (2006.01)
*G09G 5/37* (2006.01)
*G10L 15/22* (2006.01)
*G10L 15/26* (2006.01)
*G06F 3/147* (2006.01)
*G09B 5/06* (2006.01)

(52) U.S. Cl.
CPC ............... *G09G 5/37* (2013.01); *G10L 15/22* (2013.01); *G10L 15/26* (2013.01); *G06F 3/147* (2013.01); *G09B 5/06* (2013.01); *G09G 2354/00* (2013.01); *G09G 2380/12* (2013.01)

(58) Field of Classification Search
CPC ..... G09G 2380/12; G10L 15/22; G10L 15/26; G06T 13/80; G06F 3/147
See application file for complete search history.

(56) References Cited

U.S. PATENT DOCUMENTS

| | | | | |
|---|---|---|---|---|
| 6,053,737 | A * | 4/2000 | Babbitt | G09B 9/08 434/30 |
| 7,949,533 | B2 * | 5/2011 | Braho | G10L 15/06 704/270 |
| 8,866,623 | B2 * | 10/2014 | Sharon | G08B 21/06 340/963 |
| 10,043,405 | B1 * | 8/2018 | Chartier | G08G 5/0026 |
| 2003/0132860 | A1 * | 7/2003 | Feyereisen | G01C 23/00 340/963 |
| 2009/0083034 | A1 * | 3/2009 | Hernandez | G10L 15/22 704/E15.001 |
| 2017/0330560 | A1 * | 11/2017 | Wang | G10L 15/183 |

\* cited by examiner

| KSAO Assessed | Assessment Criteria | What to Measure | How to Assess | Section |
|---|---|---|---|---|
| Basic knowledge of compass rose | Student issued correct vector(s) | • Vector clearance issued<br>• Aircraft hitting boundary | • Compare correct vector with vector issued – correct vector implies basic knowledge<br>• Hitting boundary implies lack of basic knowledge | Section 1 – Basic Compass Test |
| Advanced knowledge of compass rose | Student issued correct vector(s) so aircraft reaches gate when aircraft not centered | • Vector clearance issued<br>• Aircraft location when vector issued<br>• Aircraft hitting boundary | • Compare correct vector with vector issued; incorrect vector implies lack of advanced knowledge/understanding<br>• Determine if student gives correct vector when aircraft centered, but incorrect when aircraft not centered<br>• Hitting boundary implies lack of knowledge | Section 1 – Advanced Compass Test |
| Knowledge of proper 7110.65 phraseology for issuing vector clearance | Student used correct phraseology | • Speech recognition system recognized (accepted) clearance issued<br>• System response: "say again"<br>• Speech recognition results (system heard, system confidence score indicating system confidence in correct speech recognition results)<br>• Audio track | • Accepted implies correct phraseology used<br>• Implies incorrect phraseology/mic clipping/poor pronunciation<br>• Validate audio with speech system interpretation of vector clearance to correctly assess phraseology | All |
| Interpreting a data block | Student issued correct ACID<br>Student vectored aircraft to correct gate | • Vector clearance issued<br>• Gate aircraft exits | • Correct ACID implies correct data block interpretation<br>• Correct gate implies correct data block interpretation; incorrect exit gate implies incorrect interpretation | ALL<br>Section 1: Advanced Compass Test and Section 2-4 when multiple gates depicted |

FIG. 6A

| | | | |
|---|---|---|---|
| Vectoring Skill | Ability to issue multiple vectors to navigate through shape and avoid hitting boundary | • Vector clearance issued | • Number of vectors issued. Compare vectors given to optimal vectors. Grossly over-vectoring may indicate poor performance | Section 1 Simple Shapes Sections 2-4 |
| | Ability to control more than 1 aircraft | • Time aircraft hit boundary | • Hitting boundary implies poor performance | Sections 2-4 |
| Prioritization | Determine if each aircraft reached destination gate | • Time aircraft reached destination gate<br>• Time aircraft hit boundary<br>• Vector issued | • Determine if the aircraft reached the destination gate with the least number of vectors possible | Sections 2-4 |
| Situation Awareness | Determine if student able to continue to vector aircraft as situation changes and multiple aircraft are involved | • Time vectors issued<br>• Vector clearance issued<br>• Time aircraft hit boundary | • As the situation changes (i.e., more aircraft enter or exit gate changes) determine if the student continues to issue vectors to avoid hitting the boundary and/or over-vectoring | Sections 2-4 |
| Ability/skill to handle increased/high workload | Determine if student can continually issue vectors to aircrafts as the workload increases | • Time aircraft hit boundary | • As workload increases determine ability to issue multiple vectors to navigate through shape and avoid hitting boundary | |
| | Determine if student issues correct vectors as workload increases | • Vector clearance issued | • As workload increases determine if the student over or under vectors (compared to predetermined optimal vectors) | |
| | Student able to continue when aircraft hit the boundary (e.g., did not become frazzled) | • System response: say again | • As workload increases system not able to recognize clearance may indicate inability to handle increasing workload | |

FIG. 6B

| | | | Section 4 |
|---|---|---|---|
| Adaptability | As destination gate changes, determine ability to continue to issue multiple vectors to navigate to exit gate<br><br>Determine student's ability to continue when aircraft hit the boundary (e.g., did not become frazzled) | • System response: say again<br>• Vector clearance issued/accepted<br>• Time aircraft hit boundary | • As destination changes, system not able to recognize clearance – may indicate inability to adapt to changes<br>• As destination changes, student over or under vectoring –may indicate inability to adapt to changes<br>• Actions immediately after one aircraft hit the boundary may indicate adaptability |
| Confidence issuing vector clearances | Determine if student hesitated when issuing vectors<br><br>Determine if student able to compensate when over/under vectoring an aircraft<br><br>Student able to continue when aircraft hit the boundary (i.e. Didn't become "frazzled") | • Vector clearances issued<br>• System response: "say again"<br>• Time Vectors issued<br>• Audio track – compare with Speech Recognition results<br>• Vector clearance issued<br>• Time aircraft hit boundary | All<br><br>• Speech System consistently recognized commands – may indicate confident student<br>• If system responded with "say again" determine if student able to recover<br>• Time between vectors may indicate hesitation/lack of confidence<br>• Does speech system "confidence" correlate to student's confidence?<br>• If student over/under vector, ability to compensate may indicate confidence<br>• Actions immediately after one aircraft hits the boundary may indicate confidence |

FIG. 6C

| Scanning | Determine if student able to continually scan screen in order to keep track of new aircraft entering scenario and changes in exit gate | • Vector clearances issued<br>• System response: "say again"<br>• Time Vectors issued<br>• Audio track - compare with Speech Recognition results | • If a particular aircraft is "ignored" may indicate that student not scanning properly<br>• If speech not recognized, is this due to a student becoming frazzled, because he/she noticed the aircraft too late?<br>• If issuing of vector is delayed, may indicate student late in "seeing" the aircraft - (i.e. poor scanning skills) | Sections 2-4 |
|---|---|---|---|---|

FIG. 6D

| Variable | Description |
|---|---|
| Angle of Turn Average | Average turn angle for every aircraft that was given a vector clearance in the shapes tests |
| Average Vector Count 2_1_2 | Average number of vectors given to aircraft in second shape in the Basic Shape Test |
| Average Vector Count 2_1_3 | Average number of vectors given to aircraft in third shape in the Basic Shape Test |
| Average Vector Count 2_1_4 | Average number of vectors given to aircraft in fourth shape in the Basic Shape Test |
| Average Vector Count 2_2_1 | Average number of vectors given to aircraft in the Advanced Shape Test |
| Average Vector Count 3_1_1 | Average number of vectors given to aircraft in the Simple Shape Test |
| Average Vector Count 3_2_1 | Average number of vectors given to aircraft in the first scenario |
| Average Vector Count 3_3_1 | Average number of vectors given to aircraft in the second scenario |
| Average Vector Count 4_1_1 | Average number of vectors given to aircraft in the third scenario |
| Average Vector Count 4_2_1 | Average number of vectors given to aircraft in the fourth scenario |
| Cardinal Ratio | Ratio of cardinal headings to all headings given |
| Correct Gates 1_2 | Number of correct gates in Basic Compass Test |

FIG. 6E

SYSTEM FOR EVALUATING RADAR VECTORING APTITUDE

CROSS-REFERENCE TO RELATED APPLICATIONS

This application claims the benefit of U.S. Provisional Application 62/764,950, filed on Aug. 17, 2018, the entire contents of which is incorporated herein by reference for all purposes.

STATEMENT REGARDING FEDERALLY SPONSORED RESEARCH FOR DEVELOPMENT

This invention was made with Government support under U.S. Government contract DTFAWA-10-C-00080, awarded by the Federal Aviation Administration (AJI-2). The Government has certain rights in this invention.

FIELD OF INVENTION

The present disclosure relates generally to a system, including graphic and auditory user interfaces, for evaluating radar vectoring aptitude of an individual.

BACKGROUND

With the ubiquity of air travel, there is a growing need to hire and train qualified Air Traffic Controllers (ATC). For example, the Federal Aviation Administration (FAA) plans to hire more than 6,300 ATCs between 2015 and 2020. Currently, one of the factors contributing to the inefficiency and ineffectiveness in ATC training is the inadequate assessment of student aptitude early in the training process.

Specifically, when students are hired, they are directly placed in an en route option or terminal option and then are placed in corresponding facilities based primarily on need, with little consideration of the students' individual aptitude. For example, after a student is hired by the FAA, he or she attends the FAA Academy and is assigned a training option between en route and terminal. The terminal option includes airport traffic control towers with radar, terminal radar approach control (TRACON) facilities, or combined tower with radar and TRACON facilities. Upon completion of the training at the Academy, the student is assigned to a facility to continue training until certification. Notably, the FAA bases assignments of students primarily on facility staffing needs, rather than an assessment of students' strengths and aptitude for the unique skills required by different facility types. The mismatch between student aptitude and facility placement leads to students' failure in their assigned facilities.

Student who are unsuccessful in their training at one facility are frequently transferred to another facility, typically at a lower level, where they continue training. Thus, due the lack of initial assessment of student aptitude to properly place the students, the FAA incurs significant cost in training, retraining, and relocating the students.

Thus, there is a need to for enhanced tools that can predict student success in training and help place students accordingly (e.g., in an en route, terminal, or tower environment) based on an assessment of their aptitude for specific fundamental ATC skills. Such enhanced tools would reduce the amount of time students spend in training and the student failure rate, thereby reducing training cost and risk for the agency.

BRIEF SUMMARY

Described herein are systems and methods, including novel graphical and auditory user interfaces, for evaluating a student's fundamental aptitude for ATC skills (e.g., radar vectoring) such that, for example, the student can be properly placed for further training and development. In some embodiments, the tools include graphical and auditory user interfaces and methods related to test design for obtaining an efficient and accurate assessment of the student's aptitude in a particular subject area. In some embodiments, the techniques include user interfaces and methods for determining performance criteria and conducting evaluation.

In some embodiments, an exemplary computer-implemented method comprises: displaying a graphic representation of an aircraft; displaying a predetermined shape of a plurality of predetermined shapes, wherein each of the plurality of predetermined shapes is associated with a facility type; providing an instruction for controlling the aircraft; receiving a plurality of audio inputs from a user; performing a speech-to-text analysis to each of the plurality of audio inputs to obtain a plurality of corresponding text strings; identifying, based on the plurality of corresponding text strings, a plurality of vectoring clearances associated with the aircraft; displaying an animation of the aircraft based on the plurality of vectoring clearances; and based on the plurality of vectoring clearances, calculating a facility-specific aptitude score of the user.

In some embodiments, an exemplary electronic device comprises: a display; a microphone; one or more processors; a memory; and one or more programs, wherein the one or more programs are stored in the memory and configured to be executed by the one or more processors, the one or more programs including instructions for: displaying a graphic representation of an aircraft; displaying a predetermined shape of a plurality of predetermined shapes, wherein each of the plurality of predetermined shapes is associated with a facility type; providing an instruction for controlling the aircraft; receiving a plurality of audio inputs from a user; performing a speech-to-text analysis to each of the plurality of audio inputs to obtain a plurality of corresponding text strings; identifying, based on the plurality of corresponding text strings, a plurality of vectoring clearances associated with the aircraft; displaying an animation of the aircraft based on the plurality of vectoring clearances; and based on the plurality of vectoring clearances, calculating a facility-specific aptitude score of the user.

In some embodiments, an exemplary non-transitory computer-readable storage medium stores one or more programs, the one or more programs comprising instructions, which when executed by one or more processors of an electronic device having a display, cause the electronic device to: display a graphic representation of an aircraft; display a predetermined shape of a plurality of predetermined shapes, wherein each of the plurality of predetermined shapes is associated with a facility type; provide an instruction for controlling the aircraft; receive a plurality of audio inputs from a user; perform a speech-to-text analysis to each of the plurality of audio inputs to obtain a plurality of corresponding text strings; identify, based on the plurality of corresponding text strings, a plurality of vectoring clearances associated with the aircraft; display an animation of the aircraft based on the plurality of vectoring clearances; and based on the plurality of vectoring clearances, calculate a facility-specific aptitude score of the user.

DESCRIPTION OF THE FIGURES

FIG. 6A depicts exemplary methodologies for evaluating radar vectoring aptitude of an individual, in accordance with some embodiments.

FIG. 6B depicts exemplary methodologies for evaluating radar vectoring aptitude of an individual, in accordance with some embodiments.

FIG. 6C depicts exemplary methodologies for evaluating radar vectoring aptitude of an individual, in accordance with some embodiments.

FIG. 6D depicts exemplary methodologies for evaluating radar vectoring aptitude of an individual, in accordance with some embodiments.

FIG. 6E depicts exemplary variables in the model for predicting the student's aptitude, in accordance with some embodiments.

DETAILED DESCRIPTION

Figure 1:
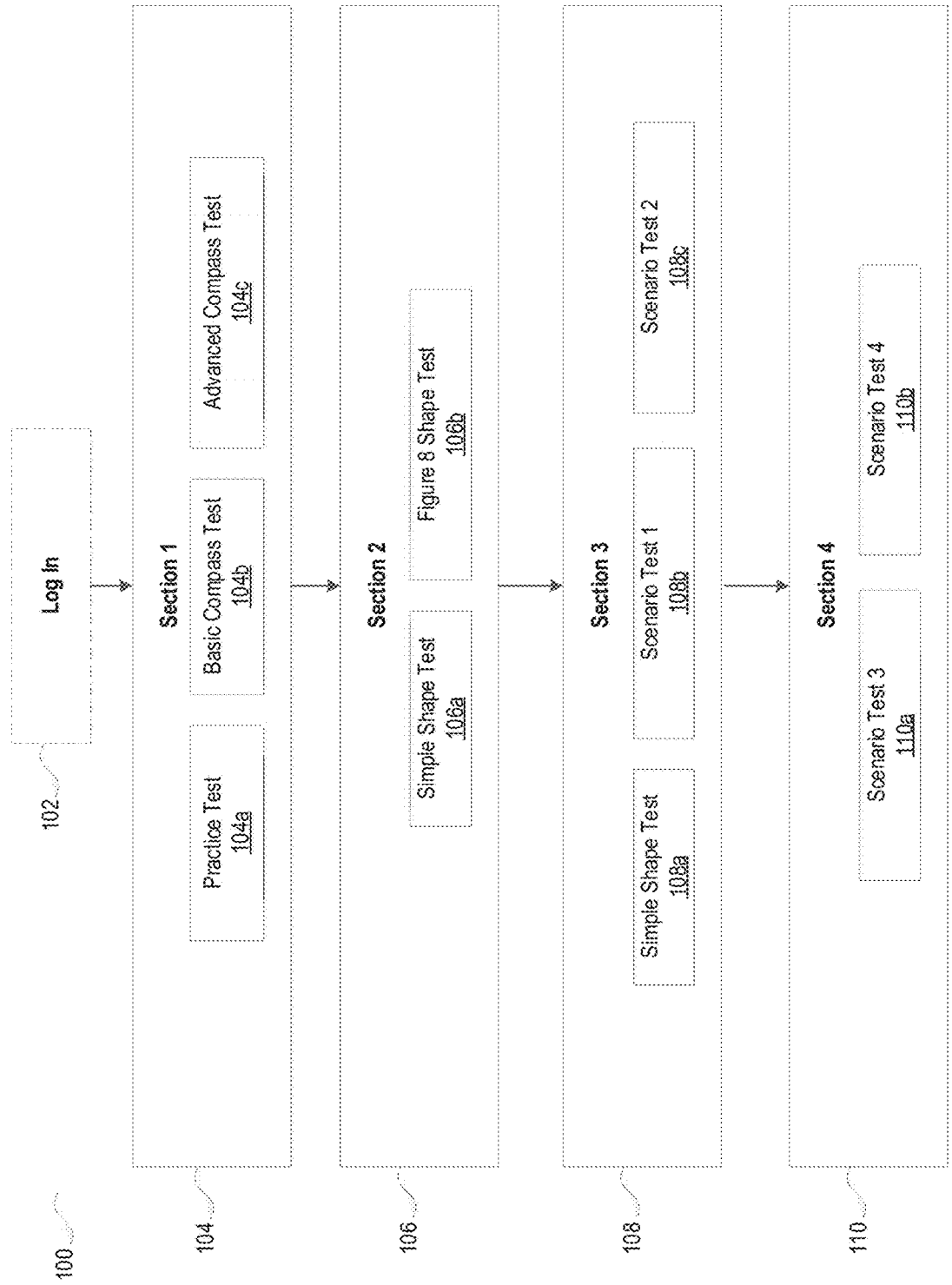
FIG. 1 depicts an exemplary system for evaluating radar vectoring aptitude of an individual, in accordance with some embodiments.

Provided herein are tools for assessing a student's fundamental aptitudes for ATC skills (e.g., radar vectoring) using a novel graphical and auditory user interface such that, for example, the student can be properly placed for further training and development. In some embodiments, the tools include user interfaces and methods related to test design for obtaining an efficient and accurate assessment of the student's aptitude in a particular subject area. In some embodiments, the techniques include user interfaces and methods for determining performance criteria and conducting evaluation.

In particular, provided herein are exemplary embodiments of the invention, including graphical and auditory user interfaces, for assessing a student's aptitude in radar vectoring. Radar vectoring is one of the critical tasks performed by terminal and en route controllers to ensure safe separation, to space aircraft, to align traffic, and to facilitate the efficient flow of traffic. The present invention provides for evaluation systems for assessing the degree to which students possess the aptitude, skills, abilities, and other characteristics to satisfactorily perform the task of radar vectoring. It should be appreciated by one of ordinary skill in the art that the techniques of the present invention can be applied to assess students' aptitude in other subject areas.

In some embodiments, a computer-implemented method comprises: displaying a graphic representation of an aircraft; displaying a predetermined shape of a plurality of predetermined shapes, wherein each of the plurality of predetermined shapes is associated with a facility type; providing an instruction for controlling the aircraft; receiving a plurality of audio inputs from a user; performing a speech-to-text analysis to each of the plurality of audio inputs to obtain a plurality of corresponding text strings; identifying, based on the plurality of corresponding text strings, a plurality of vectoring clearances associated with the aircraft; displaying an animation of the aircraft based on the plurality of vectoring clearances; and based on the plurality of vectoring clearances, calculating a facility-specific aptitude score of the user.

In some embodiments, the system animates the aircraft by simulating both aircraft performance and a basic radar screen. For example, the aircraft symbols on the screen are updated approximately every 4.5 seconds, which is roughly the update rate of some radar systems. The aircraft symbol leaves a trail on the screen of their last 5 positions to indicate the direction of travel. In some embodiments, the simulation is carried out using a basic physics model of flight—the aircraft is in level, unaccelerated flight (other than the turn), and a nominal 20 degree bank angle and 250 knot speed is assumed.

In some embodiments, the facility type includes: a terminal radar approach control facility, or an en route facility.

In some embodiments, the shape includes one or more boundaries, one or more obstacles, one or more destinations, or a combination thereof In some embodiments, the instruction is a first instruction indicative of a first destination, the method further comprising: after providing the first instruction, providing a second instruction indicative of a second destination different from the first destination.

In some embodiments, the instruction is indicative of a desired formation of a plurality of aircrafts.

In some embodiments, the plurality of vectoring clearances includes a first vectoring clearance and a second vectoring clearance, and displaying the animation of the aircraft comprises: while displaying the animation based on the first vectoring clearance, receiving an audio input indicative of the second vectoring clearance; in response to receiving the audio input indicative of the second vectoring clearance, updating the animation based on the second vectoring clearance.

In some embodiments, the method further comprises terminating the display of the animation after showing the aircraft contacting a boundary of the one or more boundaries. In some embodiments, the method further comprises identifying at least one of the plurality of vectoring clearances as incorrect.

In some embodiments, the method further comprises terminating the display of the animation after showing the aircraft contacting an obstacle of the one or more obstacles.

In some embodiments, the method further comprises identifying at least one of the plurality of vectoring clearances as incorrect.

In some embodiments, the method further comprises terminating the display of the animation after showing the aircraft reaching a destination of the plurality of destinations, wherein the destination is indicated in the instruction. In some embodiments, the method further comprises identifying at least one of the plurality of vectoring clearances as correct.

In some embodiments, the aircraft is a first aircraft, the method further comprises: simultaneously displaying the first aircraft and a second aircraft; in response to receiving an audio input, determining whether the audio input is directed to the first aircraft and the second aircraft.

In some embodiments, the method further comprises displaying a countdown timer.

In some embodiments, the method further comprises: performing a speech-to-text analysis of an audio input to obtain a text string and a confidence score associated with the text string.

In some embodiments, the method further comprises calculating the facility-specific aptitude score of the user based on: a time interval between two audio inputs of the plurality of audio inputs; a time at which the aircraft is displayed; a time at which the aircraft reaches a destination or contacts a boundary; an audio recording of the plurality of audio inputs; a plurality of confidence scores associated with the plurality of audio inputs; a total number of vectoring clearances associated with the aircraft; a number of aircrafts simultaneously displayed with the aircraft; or any combination thereof.

In some embodiments, an electronic device comprises: a display; a microphone; one or more processors; a memory; and one or more programs, wherein the one or more programs are stored in the memory and configured to be executed by the one or more processors, the one or more programs including instructions for: displaying a graphic representation of an aircraft; displaying a predetermined shape of a plurality of predetermined shapes, wherein each of the plurality of predetermined shapes is associated with a facility type; providing an instruction for controlling the aircraft; receiving a plurality of audio inputs from a user; performing a speech-to-text analysis to each of the plurality of audio inputs to obtain a plurality of corresponding text strings; identifying, based on the plurality of corresponding text strings, a plurality of vectoring clearances associated with the aircraft; displaying an animation of the aircraft based on the plurality of vectoring clearances; and based on the plurality of vectoring clearances, calculating a facility-specific aptitude score of the user.

In some embodiments, a non-transitory computer-readable storage medium stores one or more programs, the one or more programs comprising instructions, which when executed by one or more processors of an electronic device having a display, cause the electronic device to: display a graphic representation of an aircraft; display a predetermined shape of a plurality of predetermined shapes, wherein each of the plurality of predetermined shapes is associated with a facility type; provide an instruction for controlling the aircraft; receive a plurality of audio inputs from a user; perform a speech-to-text analysis to each of the plurality of audio inputs to obtain a plurality of corresponding text strings; identify, based on the plurality of corresponding text strings, a plurality of vectoring clearances associated with the aircraft; display an animation of the aircraft based on the plurality of vectoring clearances; and based on the plurality of vectoring clearances, calculate a facility-specific aptitude score of the user.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Scope of the Radar Vectoring Evaluation System

Safe, efficient, and effective vectoring involves the application of a number of basic skills. As stated by the American Institute of Research (AIR), the characteristics required for controllers to perform the job are described in terms of KSAOS. Specifically, "knowledge" is a body of factual, technical, or procedural information a person uses to perform a job; "skill" is the capability, developed through training or practice, to perform job tasks; "ability" is a general human trait a person possesses that gives him/her the capacity to carry out physical and mental acts required by a job's tasks; "other personal characteristic" is an attitude, preference, opinion, or personality trait that influences how well a person can carry out job tasks.

Key activities for terminal and en route controllers that are necessary to perform the task of radar vectoring are:
  Establish Situation Awareness
  Manage Communications
  Manage Air Traffic
  Resolve Conflicts
  Manage Traffic Flows and Sequences
  Manage Airspace For tower controllers, all of the above apply except for Managing Traffic Flows and Sequences, which is an activity primarily for airport surface movement area.

The following KSAOS were identified are necessary to effectively perform the task of radar vectoring:
  Knowledge
    Compass rose
    Difference between absolute and relative headings
    Airline call signs (e.g., AAL is American Airlines)
    Aircraft ID (ACID): Airline call sign and flight numbers in group form
    Phraseology (per JO7110.65) for turns to an absolute heading
      "ACID turn right/left heading 3 digit heading ending in 0"
      "ACID fly heading 3 digit heading"
      "ACID fly present heading"
      "ACID say heading"
      Headings are in correct digit form
    Interpreting a data block (e.g., ACID is in the first line and destination or exit gate is in the second line)
    Aircraft performance (e.g., aircraft takes time and distance to turn)
    Effect of speed and wind on turn performance
    Pilots will give a read-back to confirm clearance
  Skills, Abilities, and Other Characteristics
    Use the above knowledge to affect an aircraft's lateral trajectory in a desired way Situational awareness:
  Ability to understand and interpret all relevant parts of a scenario
  Develop a plan for all aircrafts (when to issue what vectors for separation, efficient flow, etc.) including priorities
  Ability to react to changes in the scenario (e.g., a new aircraft or emergency)
  Ability to prioritize tasks
  Adaptability: adhere to the plan but know when to deviate
  Confidence in issuing vector clearances
  Scanning Possible Differences in Vectoring Between Facility Types The differences in facility types (Tower, TRACON and En Route) affect the task of radar vectoring. In some embodiments, the exemplary evaluation system includes discriminators among these skills that may help determine a student's aptitude for vectoring and the student's likelihood for success at one type of facility vs. another. An exemplary summary of the differences in vectoring between facility types is provided below.
En Route Controllers
  Control traffic on a larger scale than terminal
  Manage aircraft that are moving at faster speeds than in the terminal airspace
  Receive slower radar update rates
  Must perform data entry while issuing clearances
  Manage flows of traffic in the en route environment more than dealing with individual aircraft
  Generally vector aircraft with smaller angles than TRACON controllers
Terminal (TRACON) Controllers
  Controllers are more comfortable pointing aircraft at each other
  Tend to issue repetitive voice commands quickly
  Control traffic on a smaller scale and aircraft are moving at slower speeds than the en route environment
  Receive faster radar update rates
  Frequently vector aircraft with larger angles than en route (e.g., downwind to base legs)
  Perform precision, focused vectoring (e.g., to fine-tune spacing)
  Generally faster than en route controllers
  Communicate with pilots that are generally expecting clearances
Airport Traffic Control Tower (ATCT) Controllers
  Issue clearances which are generally very time-sensitive, compared to en route
  Perform minimal to no vectoring
  Have fewer options for controlling traffic (e.g., in general cannot adjust speeds)

Exemplary Evaluation System

The evaluation system is designed to cover a broad range of KSAOS. Specifically, the evaluation system for radar vector aptitude is designed to fairly and objectively assess many of the KSAOs that are necessary for a controller to successfully perform the task of vectoring, such as:
  Demonstrates knowledge of and facility with the compass rose
  Demonstrates proper use of phraseology for absolute turns by using an automated speech recognition (ASR) system.
  Issues vector commands to aircraft, to avoid running them outside of designated airspace
  Demonstrates ability to successfully manage an increasing workload of aircraft
  Demonstrates the above without using an excessive number of turns or grossly incorrect turns
  Demonstrates any skills/abilities/aptitudes that may be indicators of success in a particular facility type The evaluation system includes one or more computer-implemented test, which allow for standardization, repeatability and performance to be objectively measured. The computer-implemented tests allow for objective data collection and performance analysis by ensuring that all students are given the same tasks, under the same conditions. Further, the computer-implemented test is designed for students with limited knowledge and varying degrees of proficiency by including practice levels and allowing students to review additional knowledge necessary to complete the test such as, a simplified list of airline call signs, a simplified data block and an onscreen compass rose for part of the initial sections.

FIG. 1 depicts an exemplary evaluation system 100 for assessing a student's aptitude in radar vectoring, with dash blocks denoting optional components. As shown, the evaluation system 100 includes 4 sections. Each section includes multiple computer-implemented tests featuring graphical and auditory user interfaces, and each test includes multiple trials. This allows for varying levels of difficulty and an opportunity to adequately test for basic knowledge and skills as well as facility-specific aptitude. In particular:
  Section 1 is designed to evaluate a student's knowledge of the compass rose, data block, and phraseology as well as their ability to use this knowledge to effectively vector aircraft(s). Section 1 includes Practice Test 104a, Basic Compass Test 104b, and Advanced Compass Test 104c.
  Section 2 is designed to evaluate the student's ability to vector or steer moving aircraft(s). Section 2 includes: Simple Shape Test 106a and Figure 8 Shape Test 106b.
  Section 3 is designed to evaluate the student's efficiency using vectors and to predict how a student may perform in different facility types, and in scenarios that last longer. Section 3 includes Simple Shape Test 108a, Scenario Test 1 108b and Scenario Test 2 108c.
  Section 4 is designed to evaluate the student's ability to vector aircraft in specific facility types while handling additional challenges, such as increased workload and the unexpected changes. Section 4 includes: Scenario Test 3 110a and Scenario Test 4 110b.

As shown above, a practice test is provided at the beginning of the first section. The evaluation system requires that a student know and understand a compass rose and be familiar with absolute headings and vector clearance phraseology; it is expected that this knowledge was gained at a prior time (e.g., the beginning of their training at the FAA Academy). Thus, the practice test is provided in order to ensure that the students have this basic knowledge of the compass and absolute headings before proceeding to the other tests. Further, the practice test includes instructions that allow the student to interact with the user interface and speech system, assuring the student's familiarity and proper system performance.

While portions of system 100 are described herein as being performed by particular devices, it will be appreciated that system 100 is not so limited. In other examples, system 100 is implemented using only a single electronic device (e.g., electronic device 800) or multiple electronic devices. In system 100, some blocks are, optionally, combined, the order of some blocks is, optionally, changed, and some blocks are, optionally, omitted. In some examples, additional components may be implemented in combination with the system 100.

In some embodiments, the evaluation system 100 includes an optional log-in component 102. Specifically, each student will be assigned a unique username and password prior to the first section. When the student logs in, the system presents them with the instructions. The students are required to complete each test in the prescribed order and are not allowed to repeat tests. In some embodiments, the system presents the student with a conclusion screen at the end of each test and each section. In some embodiments, assessment (including introduction, instructions and practice) will take less than 2 hours.

Exemplary User Interfaces of Section 1

The goal of Section 1 is to present graphical and auditory user interfaces for evaluating a student's knowledge of the compass rose, data block, and phraseology as well as their ability to use this knowledge to effectively vector aircraft.

The first test of Section 1 is Practice Test 104a. As discussed above, the purpose of the Practice Test 104a is to allow the student enough exposure to the interface and phraseology so that students with no prior knowledge or experience can interact with the UI and speech recognition system in order to issue vector commands. In the Practice Test 104a, students are presented with trials that will familiarize them with the compass rose, proper phraseology, microphone (mic) interaction, and the user interface. In some embodiments, the system requires knowledge of call signs of a number of airlines, for example, American Airlines (AAL), Delta Air Lines (DAL), Southwest Airlines (SWA) and United Airlines (UAL). These airlines allow for a reasonable mix of operational variety, are common, and students are familiar with them.

Figure 2A:
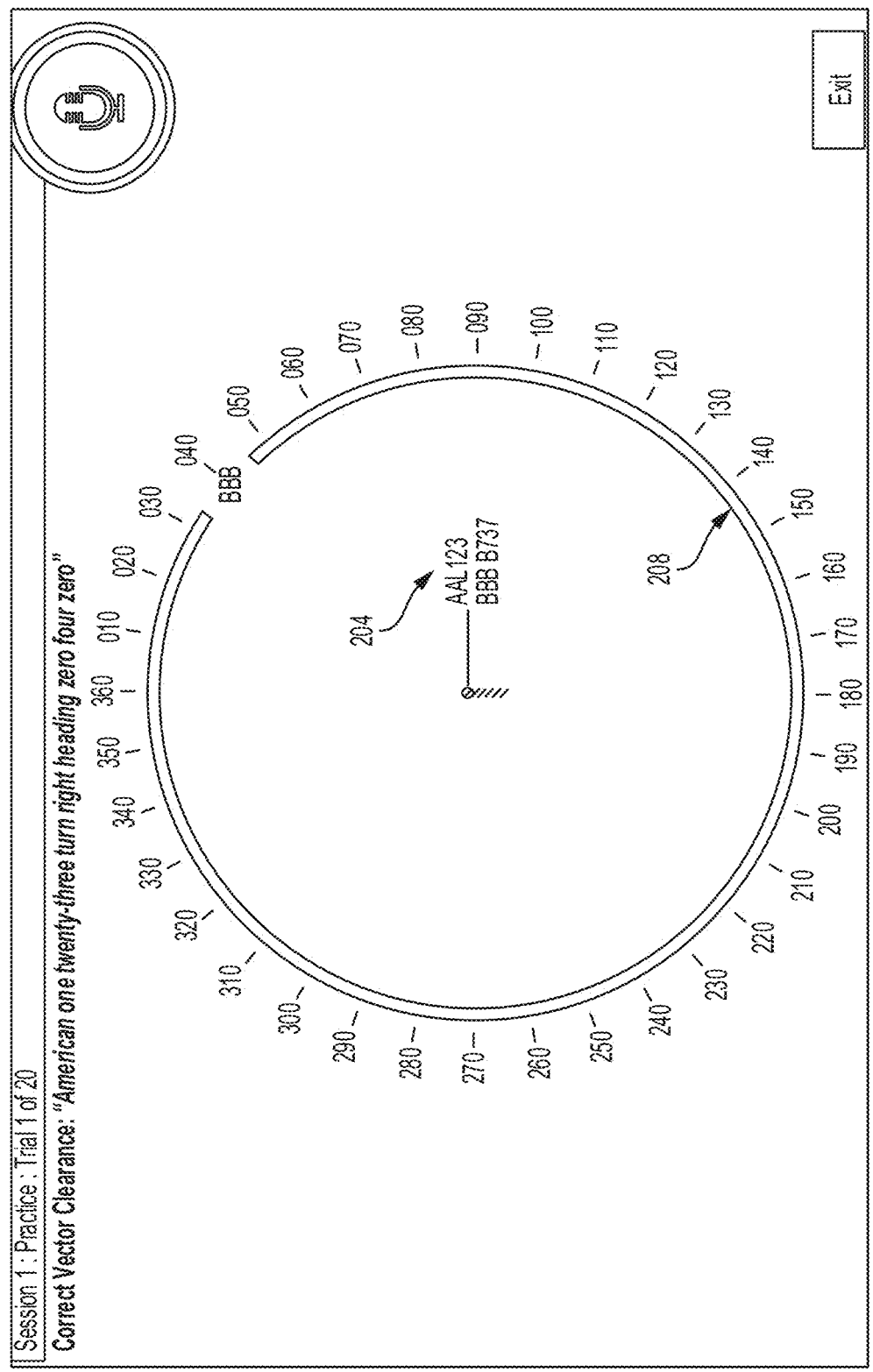
FIG. 2A depicts an exemplary user interface of an electronic device, in accordance with some embodiments.

FIG. 2A depicts an exemplary user interface 200 for the Practice Test 104. As shown, the user interface 200 presents: a compass 208; an aircraft in the center of the circle, depicted with a 2-line data block 204: first line indicating the ACID ("AAL 123"), the second line indicating the 3-character destination ("BBB B737"); the correct vector command 210 for the student to repeat ("American one twenty-three turn right heading zero four zero"); and a blinking mic icon 206, indicating the student should issue the vector clearance.

The correct vector command is for guiding the aircraft from the center of the depicted circle to the noted destination gate. The system provides instructions to prompt the student to repeat the displayed vector command 210. In some embodiments, the instructions include textual instructions, graphic instructions, audio instructions, or any combination thereof. In some embodiments, the student can provide a single audio input by pressing and holding (e.g., via a mouse or a tap on a touch-sensitive screen) the mic icon 206 and releases the icon when the audio input has been provided. In some embodiments, the student can provide the audio input directly without pressing the mic icon 206. The system presents the mic icon 206 as highlighted or in a differentiating color when the student is issuing the vector clearance.

Upon receiving the audio input from the student, the evaluation system performs speech-to-text processing on the audio input to obtain one or more text strings. In some embodiments, the evaluation system further obtains one or more confidence scores associated with the one or more text strings. In some embodiments, the evaluation system determines whether the audio input corresponds to a correct reading of the vector clearance by comparing the text strings and the correct vector command. In some embodiments, the evaluation system can determine that the audio input corresponds to a vector clearance but it is different from what appears on the screen. For example, the audio input is ". . . turn right heading zero four zero" when the correct vector clearance is ". . . turn left heading zero four zero". The determination can be made based on semantic parsing of the text strings, similarity scores between the text strings and the correct vector clearance, confidence stores associated with the text strings, or a combination thereof. For example, the evaluation system may determine that the audio corresponds to a vector clearance but it is different from what appears on the screen if the similarity score of the text string is above a first threshold (e.g., have some overlapping words with the correct vector clearance) but below a second threshold (e.g., not identical to the correct vector clearance).

If the vector clearance is read correctly, the system responds with correct pilot read-back. For example, the user interface displays an animation of the aircraft, showing the aircraft exiting through the destination gate. If, however, the evaluation system determines that the vector clearance is not read correctly, the system responds with "say again" if the system does not recognize the clearance; or "please repeat the correct vector clearance" if the student utters a clearance that is different from what appears on the screen.

During the Practice Test 104a, the evaluation system presents 20 trials. The system will pause in between trials and present the student with a Next Trial button. The system will present the next trial when the student chooses the Next Trial button. In some embodiments, the vector clearance tested in the 20 trials cover a variety of airlines, gate locations, and/or headings.

In some embodiments, the evaluation system collects the following data from the Practice Test 104a: time student logs on; time spent on each page; time on each trial; occurrence of "Say Again"; occurrence of "Please repeat the correct vector clearance"; speech recognition results (system heard/system responses etc.); audio recordings of user utterances.

The purpose of the Basic Compass Test 104b is to determine if students can issue a single vector clearance to a stationary aircraft, thereby assessing knowledge of the compass rose, data block knowledge, and proper phraseology. The Basic Compass Test 104b provides a user interface similar to the Practice Test 104a, but without the correct vector clearance such that the student is required to determine the correct vector clearance to guide the aircraft to the destination gate and then issue the vector command using correct phraseology.

Figure 2B:
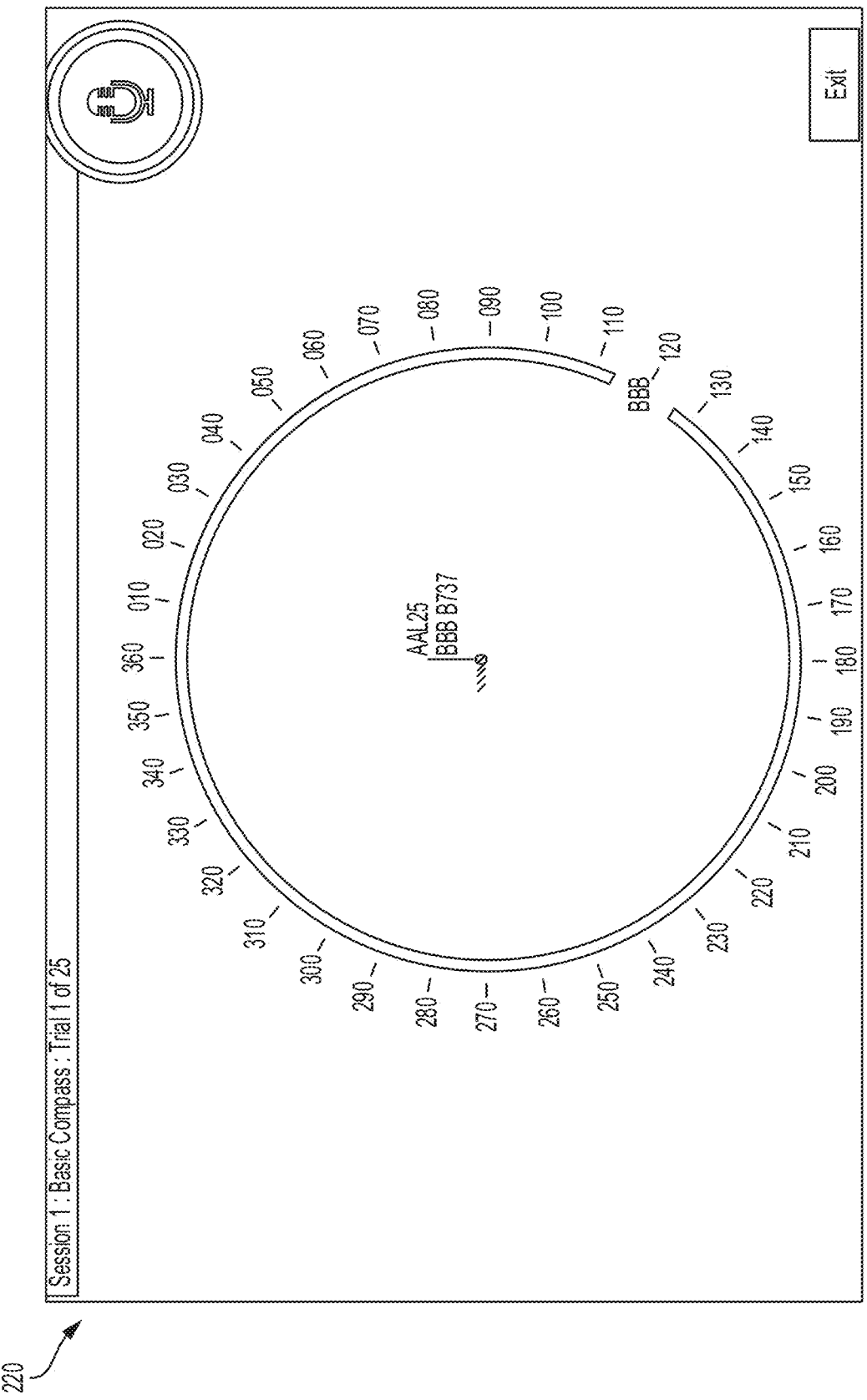
FIG. 2B depicts an exemplary user interface of an electronic device, in accordance with some embodiments.

FIG. 2B depicts an exemplary user interface 220 for Basic Compass Test 104b. Unlike the user interface 200, the user interface 220 does not include the correct vector command. The system accepts vector clearances in 10-degree increments and in compliance with JO 7110.65 phraseology (e.g., 000, 010, 020, . . . , 350, 360). If the student issues the correct vector clearance, the system responds by repeating the correct clearance and animating the aircraft as it exits the gate. If the student issues and incorrect clearance, the system animates the aircraft and show the aircraft hitting the boundary, which is highlighted as the aircraft contacts it, and ends the trial.

In some embodiments, the Basic Compass Test 104 includes 25 trials with increasing difficulty. For the first 10 trials, there is no time restraint and additional help is given upon repeated student phraseology error. For example, if the system responds 3 times with "say again", the system may display the correct vector clearance to ensure students understand the correct phraseology required. After 10 trials are complete, the system displays a countdown clock, initially set to 20 seconds, to add a sense of urgency and help to determine the student's ability to issue a clearance under a time constraint, and no additional help is provided. If the countdown clock counts down to zero, the system marks the trial as incorrect and the student is considered to not complete the trial. The system pauses and the Next button is displayed. For the last 5 trials, the compass will be removed from the screen to test the student's knowledge of headings.

In some embodiments, the evaluation system collects the following data during the Basic Compass Test: time student begins test, time spent on each page, time spent on each trial, vector clearance issued, location of aircraft after vector issued (exit gate or hit boundary), countdown clock time when vector given (for later trials), occurrence if countdown clock goes to zero, "Say Agains", speech recognition results (system heard/system response), time system pauses, time when student selects Next button, and audio recordings of user utterances.

Figure 2C:
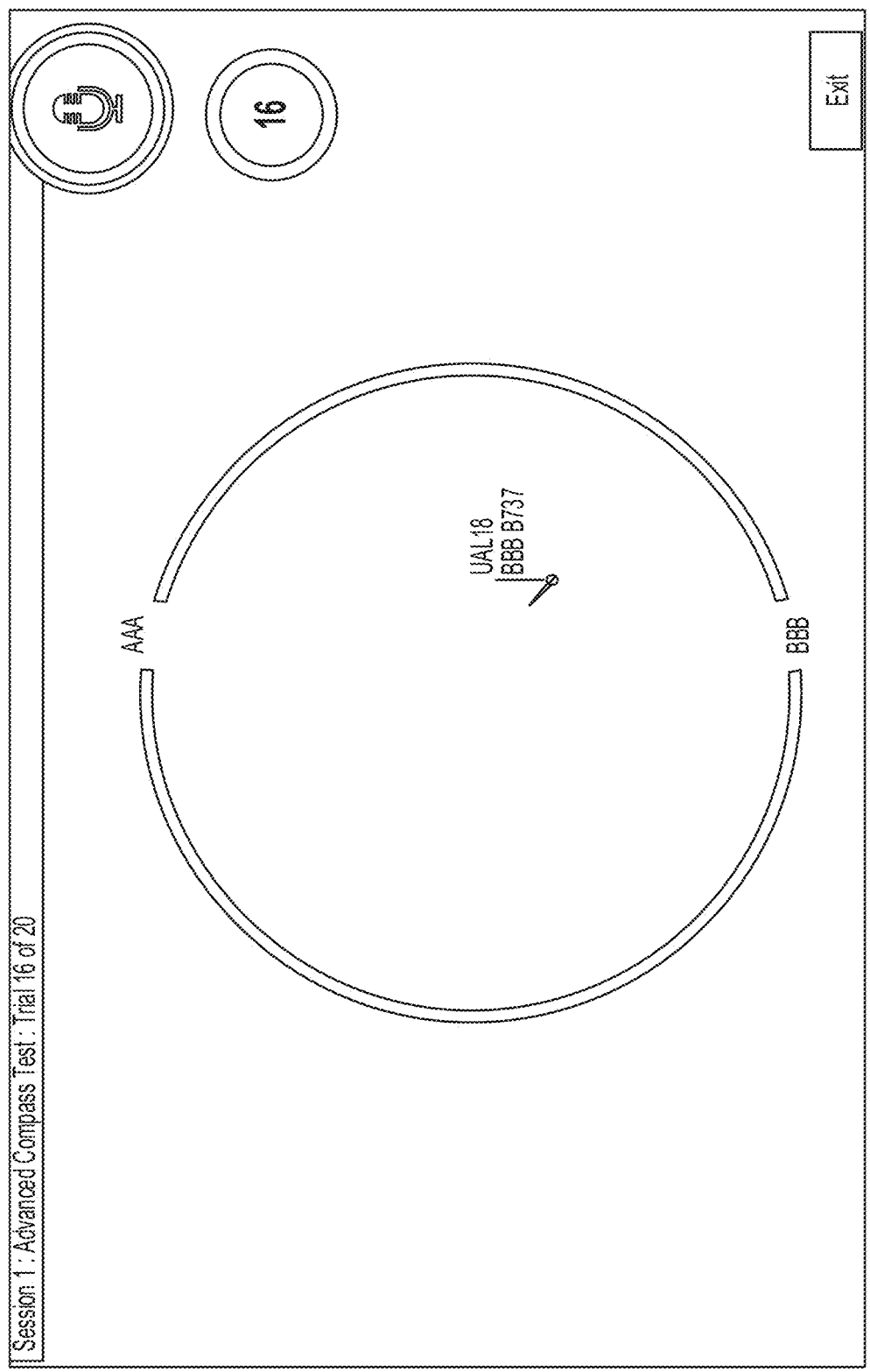
FIG. 2C depicts an exemplary user interface of an electronic device, in accordance with some embodiments.

The purpose of the Advanced Compass Test 104c is to determine if students can demonstrate issuing accurate vector commands to an aircraft not centered in the compass rose. This requires a deeper understanding of spatial awareness. FIG. 2C depicts an exemplary user interface 240 for the Advanced Compass Test 104. As shown, the user interface 240 includes a countdown clock 248 and two exits gates 244 and 246 are displayed. Further, the aircraft 242 is not centered in the circle and the compass is removed.

The Advanced Compass Test 104c includes of 20 trials, with increasing difficulty. After 10 trials are completed, a countdown clock is displayed on the screen, initially set to 25 seconds. Additionally, the aircraft is not centered in the circle, making it more challenging to determine the correct vector necessary for the aircraft to reach the correct destination gate. After 15 trials, two exit gates appear, requiring the student to interpret the second line of the data block. After 12 trials, the compass is removed. The objectives of this test are to test the student's advanced knowledge of the compass rose and knowledge of interpreting a data block.

In some embodiments, the evaluation system collects the following data from the Advanced Compass Test 104: time student begins test, time spent on each page, time spent on each trial, countdown clock time when vector given, occurrence if countdown clock goes to zero, vector issued, location of aircraft after issue vector (exit gate or hit boundary), "Say Agains", time system pauses, time student selects Next button, speech recognition results (system heard/system response), audio recording of the user utterances.

Exemplary User Interfaces of Section 2

The purpose of Section 2 (and all subsequent "Shape" tests) is presenting graphical and auditory user interfaces for evaluating the student's ability to vector moving aircraft. In Section 1, the student is expected to provide a single audio input to vector the aircraft, and the aircraft's response to the student's audio input (e.g., speed of movement) may not be indicative of a realistic response (e.g., the aircraft moves relatively fast so as to display the result efficiently). In Section 2, aircrafts are modeled realistically in terms of speed and rates of turn. As opposed to the previous test section, students can give multiple vectors in sequence to "steer" aircraft to their destinations. Whereas there is right and wrong in Section 1, vectoring an aircraft through the shapes can have multiple solutions as long as the aircraft reaches its correct destination without hitting the boundary walls. This is both more realistic and allows the system to assess the student's ability to scan, prioritize, and work towards multiple objectives.

Section 2 includes two tests: Simple Shape Test 106a and Figure 8 Shape Test 106b. Section 2 builds upon the knowledge and skills assessed in Section 1. Additionally, situation awareness, adaptability, prioritization, scanning and confidence will be assessed in Section 2.

The first test in Section 2 is a Simple Shape Test 106a. The student issues multiple vectors to the aircraft. In addition to vectoring skills, the student will demonstrate situational awareness, adaptability, prioritization and ability to scan. Their confidence in issuing vector clearances will also be assessed.

Figure 3A:
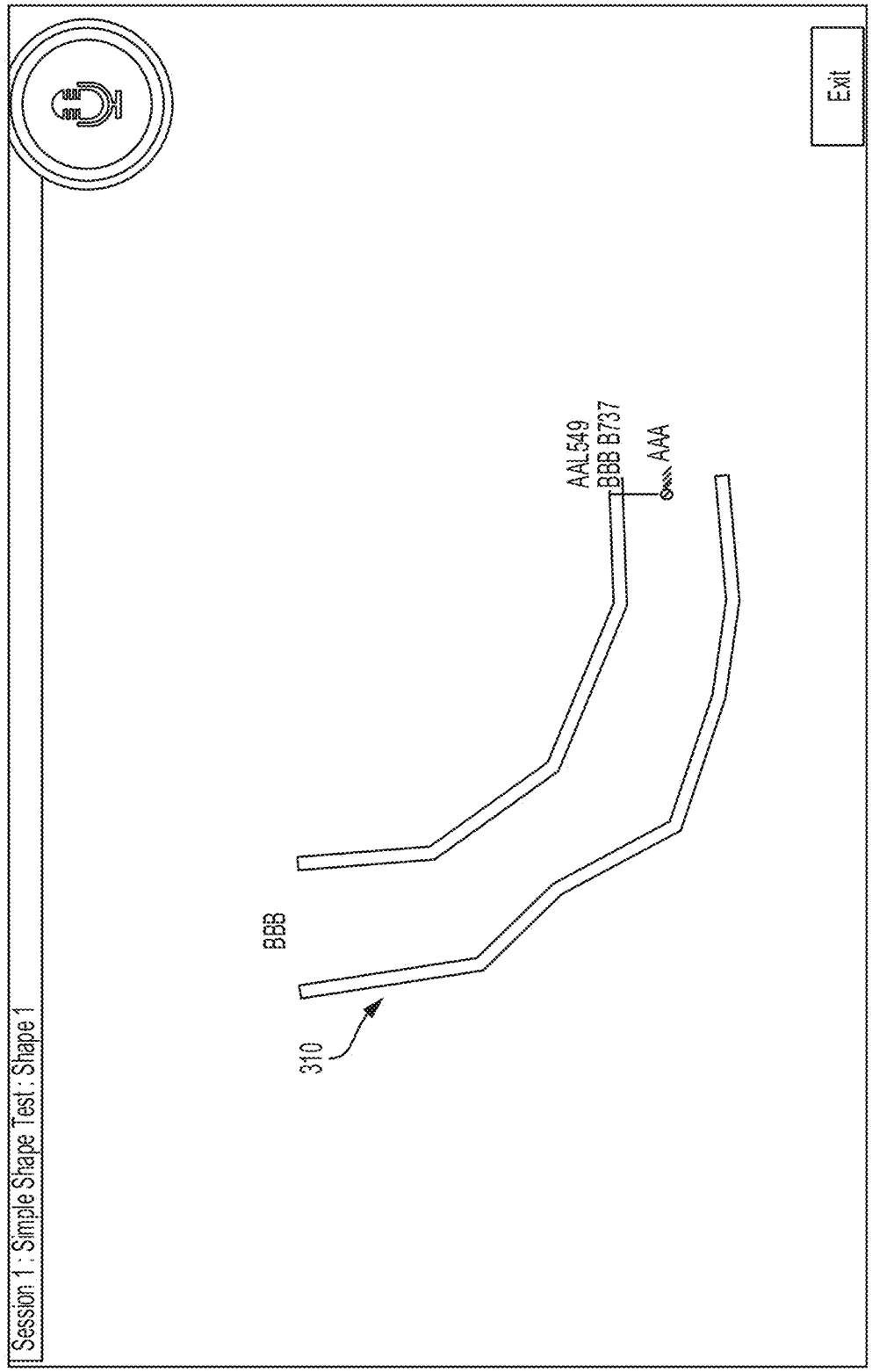
FIG. 3A depicts an exemplary user interface of an electronic device, in accordance with some embodiments.
Figure 3B:
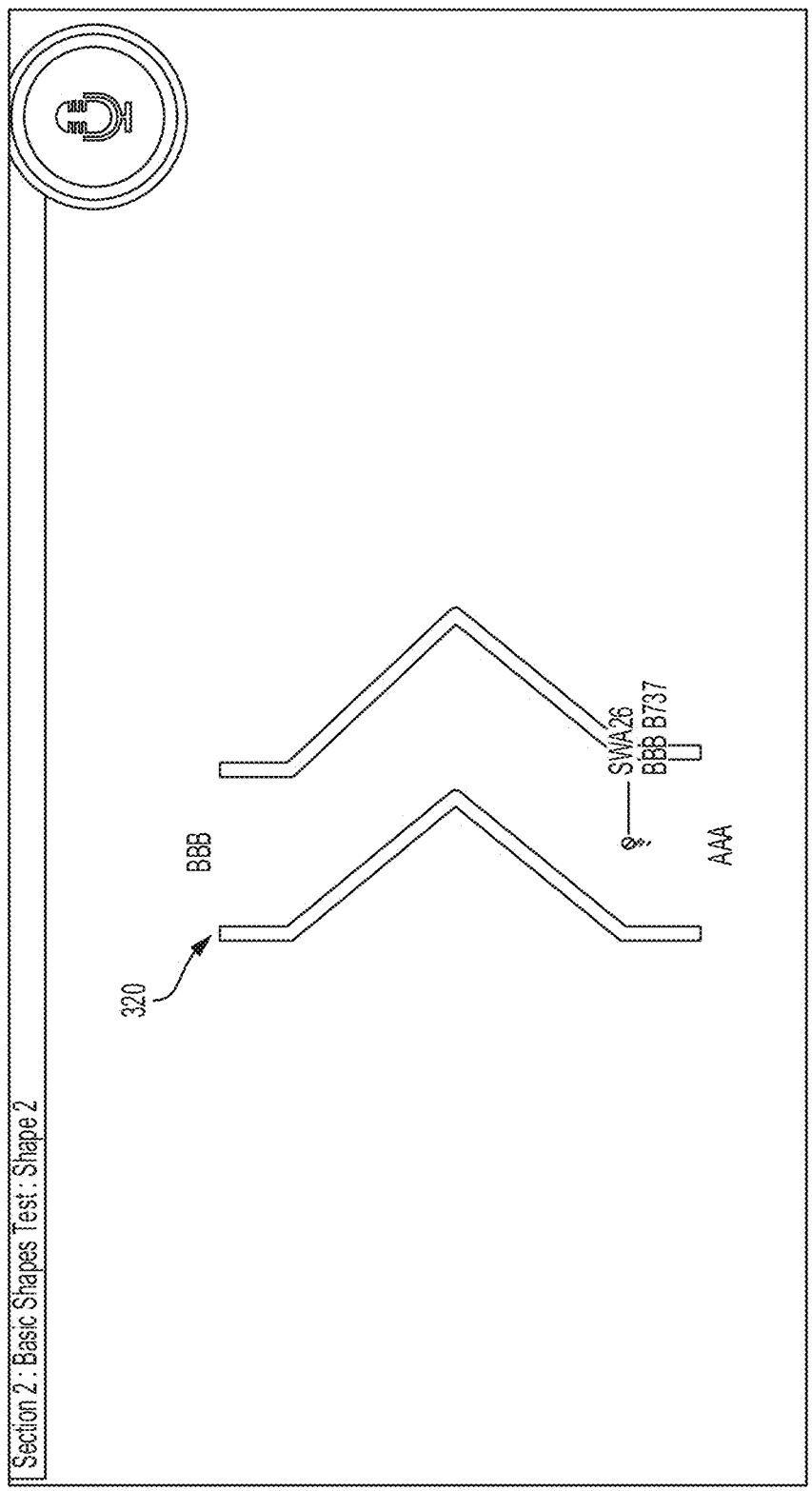
FIG. 3B depicts an exemplary user interface of an electronic device, in accordance with some embodiments.
Figure 3C:
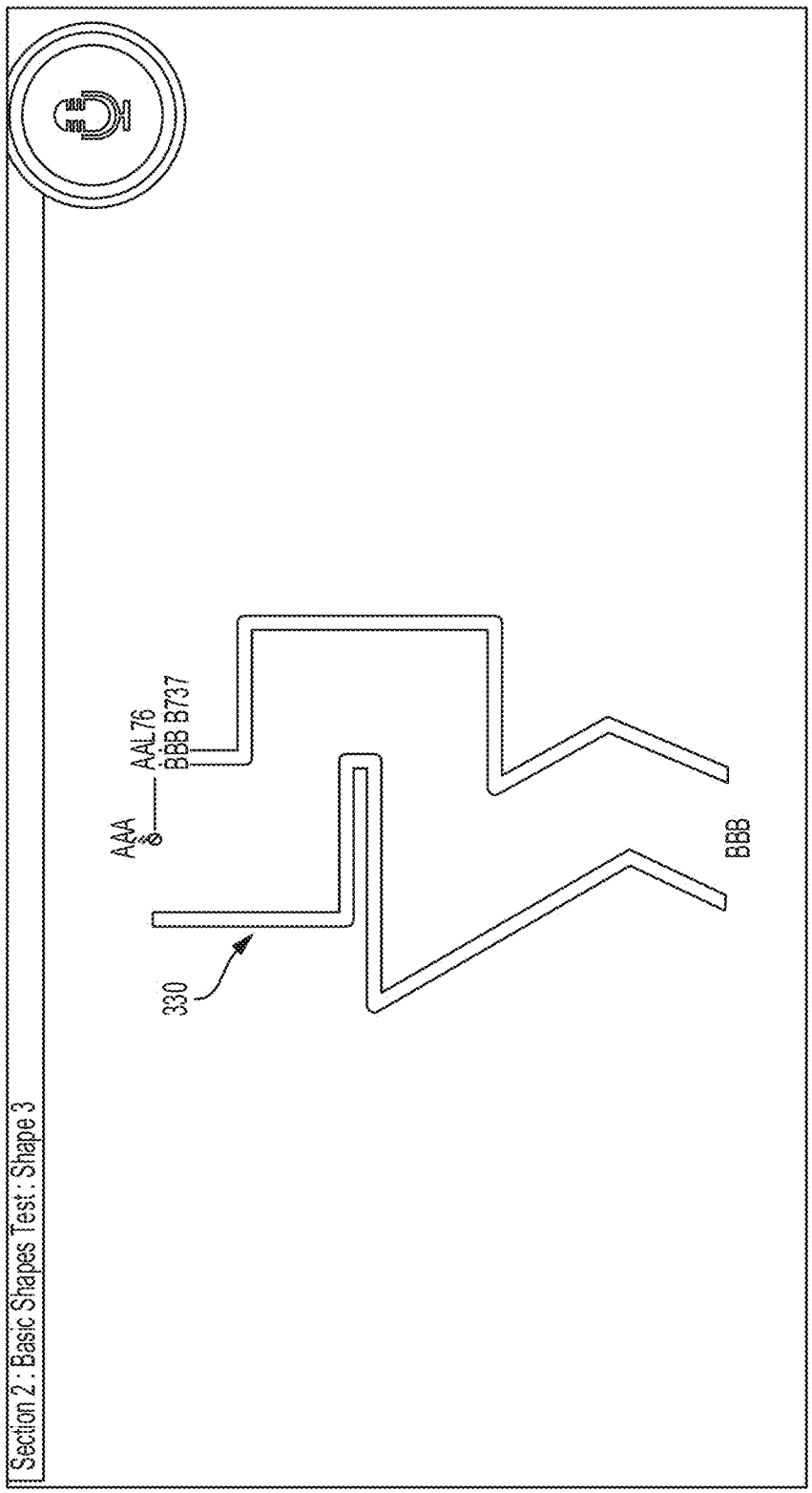
FIG. 3C depicts an exemplary user interface of an electronic device, in accordance with some embodiments.
Figure 3D:
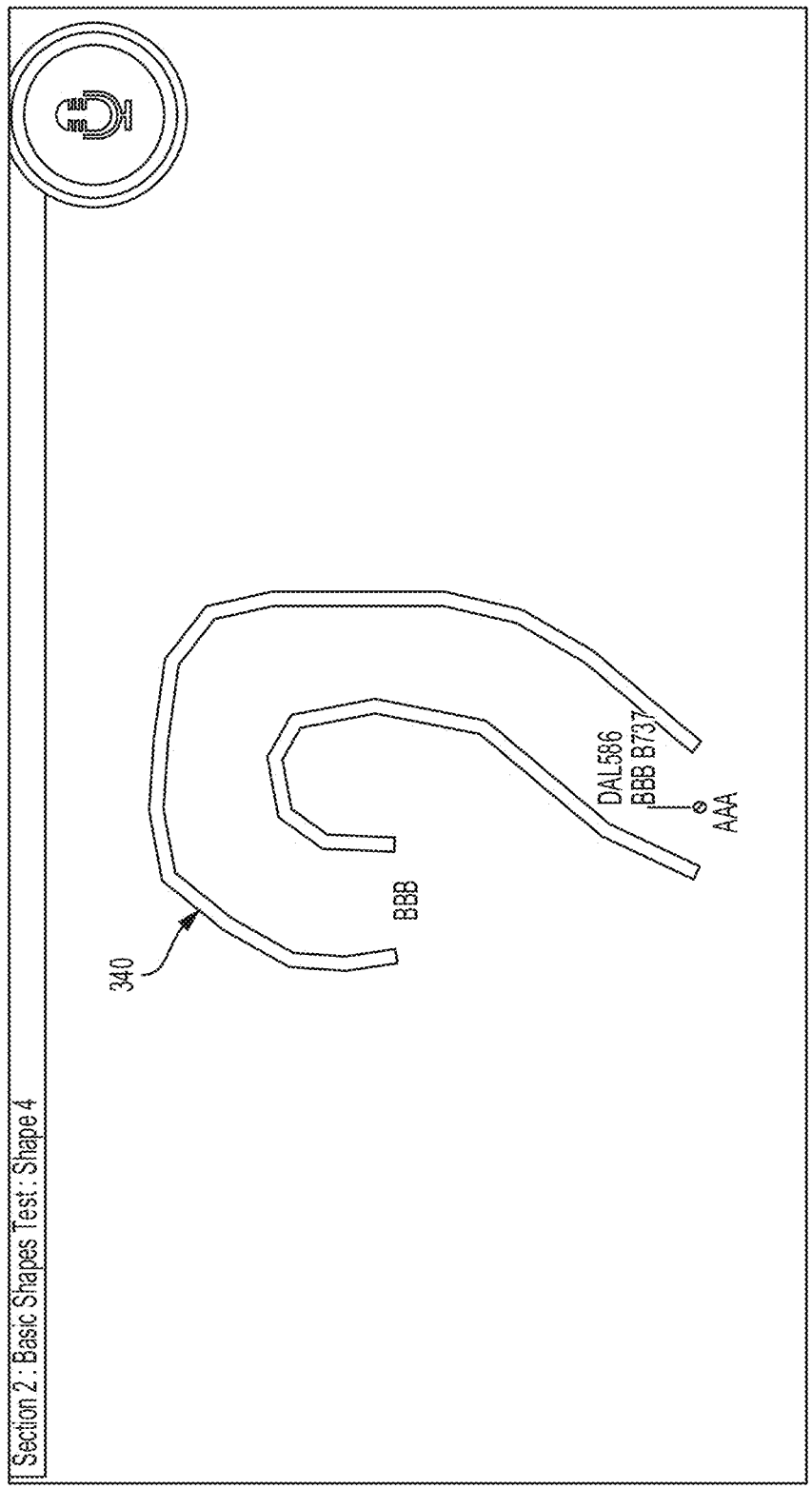
FIG. 3D depicts an exemplary user interface of an electronic device, in accordance with some embodiments.

FIG. 3A-D depict exemplary user interfaces for the Simple Shape Test 106a, which include four shapes each having multiple turns, thus requiring the student to issue multiple vectors to an aircraft in order to maneuver the aircraft through the shape to the destination gate. The first shape 310 shown in FIG. 3A is a relatively easy introduction to moving aircraft. The second shape 320 shown in FIG. 3B introduces the need for multiple vectors as well as managing multiple aircrafts. The third shape 330 shown in FIG. 3C requires the use of sharper turns in a tighter area, so the student must exhibit their understanding of the time and distance taken by the aircraft in turns. Additionally, aircraft are flying south (i.e. down the screen) so students must demonstrate their understanding and use of vectors from the pilot's perspective, i.e. that issuing a left turn will cause the aircraft to move right on the screen. The fourth shape 340 shown in FIG. 3D presents a flow of traffic, so the system can assess whether a student adjusts their vectors, i.e. showing if they learn from mistakes and/or optimize their use of vectors.

In some embodiments, the system presents 1 moving aircraft for the first shape and second shape, while presenting 3 aircraft for the third shape and 5 aircraft for the fourth shape, each with a unique ACID. As such, the student's ability to use their knowledge of the compass and proper phraseology in order to vector will be assessed. Additionally the student's ability to control more than one aircraft will be determined. Some aircrafts will enter from same exact location in order to see if student can adjust the vector commands to vector aircraft as efficiently as possible.

The system accepts vectors in 10-degree increments (e.g., 000, 010, 020, . . . , 350, 360). After the vector clearance is issued, the system will respond with the vector clearance read back or "say again" if incorrect phraseology was used. The system highlights the boundary as the aircraft contacts it, if the vector given is incorrect. If there is only one aircraft in the trial, the system pauses if the aircraft hits the boundary or exits the correct gate and a "Next" button will be displayed. If there are multiple aircrafts, the system continues the trial as long as one of the aircrafts has not contacted the boundary or exited the gate. The system presents the next shape/trial when the Next button is chosen.

In some embodiments, the evaluation system collects the following data from the Simple Shape Test 106a: time student begins section, time student begins test, time student begins each shape, time student ends each shape, time student ends test, time student ends section, time vector is issued, each vector clearance given to each aircraft, location of aircraft when vector clearance given, location of aircraft after vectors issued (exit gate or hit boundary), "Say Agains", speech recognition results (system heard/system response), time system pauses, time student selects Next button, audio recordings of user utterances.

Figure 8:
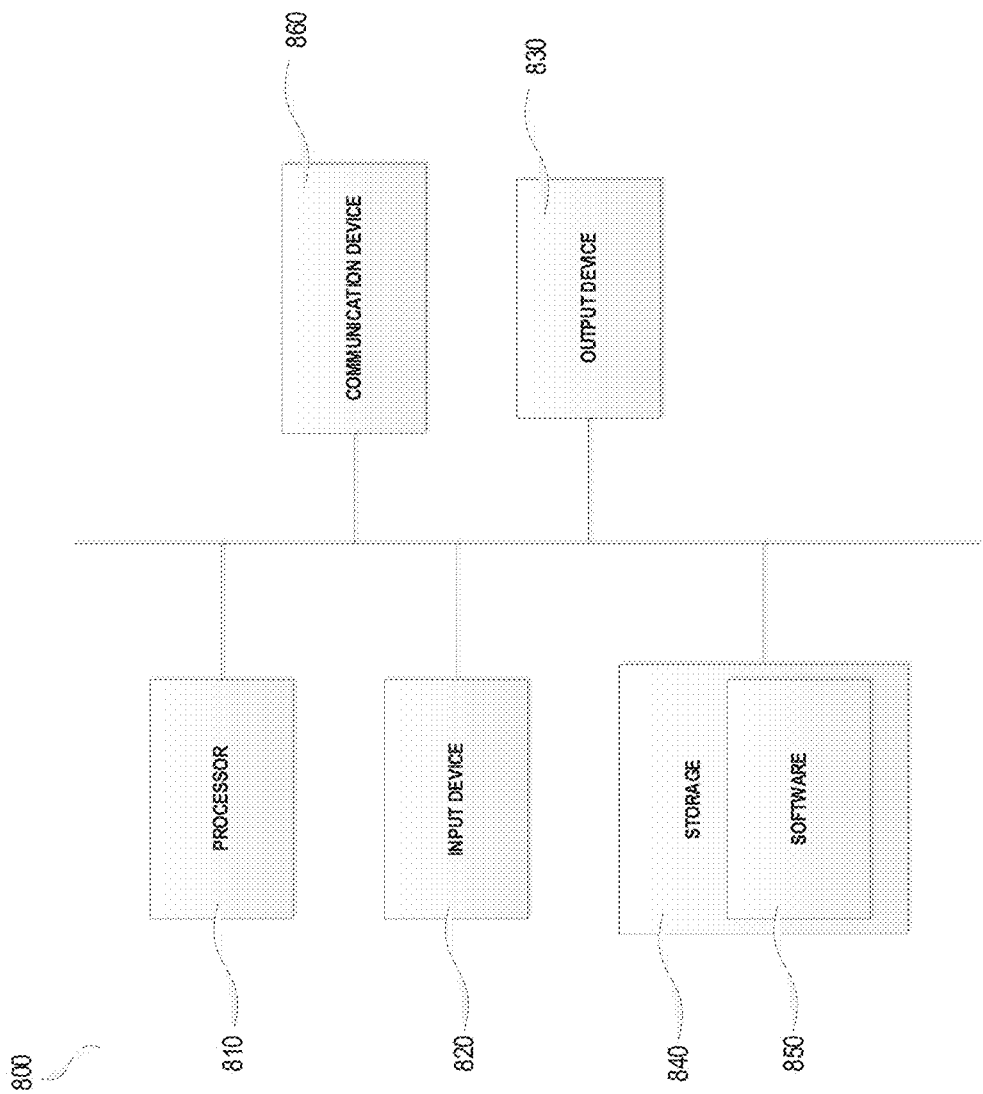
FIG. 8 depicts an exemplary electronic device in accordance with some embodiments.

The second test in Section 2 is the Figure 8 Shape Test 106b. The student guides aircraft through a more complex, "figure 8" shape. The purpose of the Advanced Shape Test is to test the student's ability to handle a more complex scenario—i.e. one that requires many more vectors per aircraft and with more aircraft flying simultaneously. Additionally, this specific shape is most efficiently managed with smaller angles issued with plenty of advanced planning; students who wait to turn aircraft will have to issue larger turns and use more vectors. Mixing the origin and destination pairs for the aircraft requires the student to demonstrate a mastery of the compass.

Figure 3E:
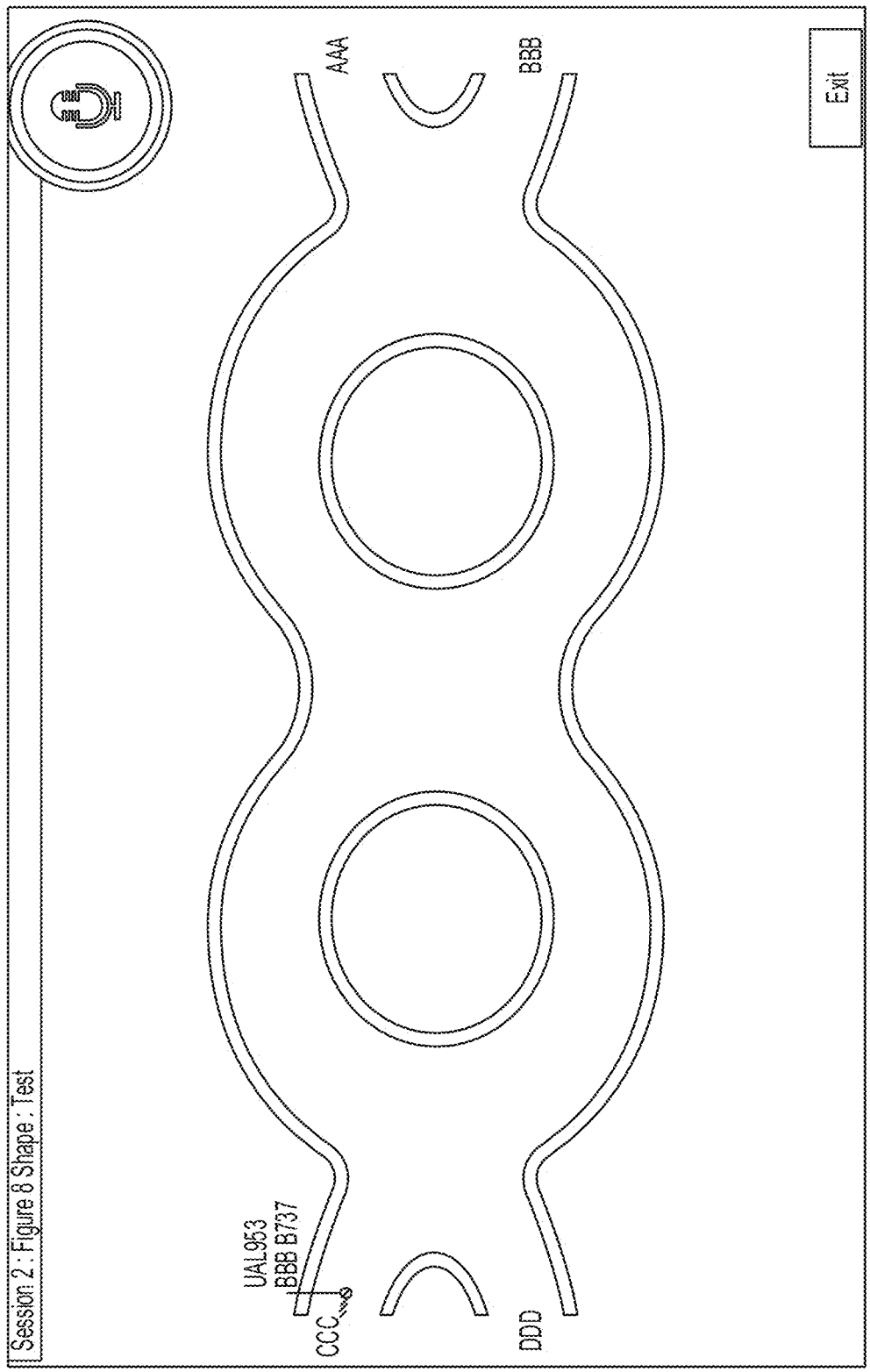
FIG. 3E depicts an exemplary user interface of an electronic device, in accordance with some embodiments.

FIG. 3E depicts an exemplary user interface 320 for the Figure 8 Shape Test 106b. There are a total of 4 aircrafts, 2 entering from top left and 2 entering from bottom left, and at any given time the student will control 3 aircrafts. This will allow many of the KSAOs that are necessary for vectoring an aircraft to be assessed such as vectoring skills, prioritization, situation awareness, the ability to handle an increased workload, confidence and scanning. In some embodiments, the speeds of the aircrafts may be reduced.

In some embodiments, the evaluation system collects the following data from the Figure 8 Shape Test 106b: time student begins section, time student begins test, time end each trial, time system pauses, time student begins each shape, time student ends each shape, time student ends test, time student ends section, time vectors issued for each aircraft, vectors issued for each aircraft, location of aircraft when vector clearance issued, location of aircraft after vectors issued (exit gate or hit boundary), "Say Agains", speech recognition results (System heard/system response), time system pauses, time student selects Next button, audio recordings of user utterances, location of aircrafts in order to playback.

Exemplary User Interfaces of Section 3

Section 3 includes computer-implemented tests directed to facility-specific scenarios. The purpose of the facility-specific scenarios (plus the basic shape test) is presenting graphical and auditory user interfaces for evaluating the student's efficiency using vectors and to predict how a student may perform in different facility types, and in scenarios that last longer.

The following tests are administered in Section 3: Simple Shape Test 108a, Scenario 1 Test 108b and Scenario 2 Test 108c. Section 3 continues assessing a students' vectoring skills as well as situation awareness, adaptability, prioritization and scanning. A student's confidence while issuing the vector clearance will also be considered. There are two scenario tests 108b and 108c, which will aid in determining a student's ability to vector in a terminal and en route environment.

Figure 4A:
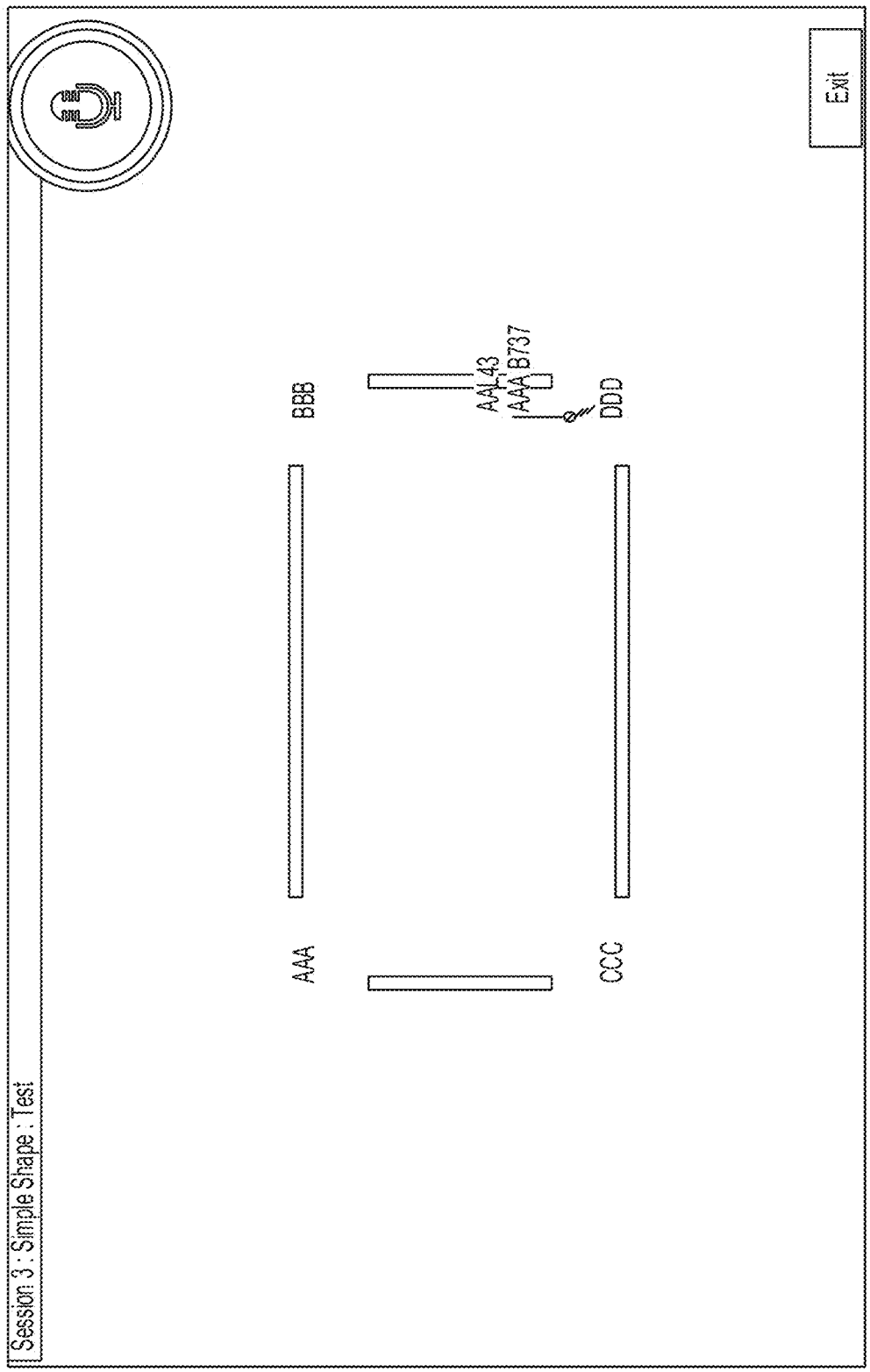
FIG. 4A depicts an exemplary user interface of an electronic device, in accordance with some embodiments.

The first test in Section 3 is a Simple Shape Test 108a. The student issues multiple vectors to a total of 8 aircraft. In addition to basic vectoring knowledge and skills, the student will continue demonstrating situational awareness, adaptability, prioritization and ability to scan. Their confidence in issuing vector clearances will also be assessed. FIG. 4A depicts an exemplary user interface for the Simple Shape Test 108a. The Simple Shape Test is designed to be very open which allows the student to vector aircraft efficiently (or not). In the depicted example, the student is required to vector an aircraft entering from DDD to another gate (e.g., AAA) based on the instructions given. By using accurate, efficient vectors the student can easily handle the larger number of concurrent aircraft, otherwise the student may get task saturated handling all the aircrafts. In some embodiments, the student is required to issue multiple vectors to 8 aircraft, and the speed is reduced.

Figure 4B:
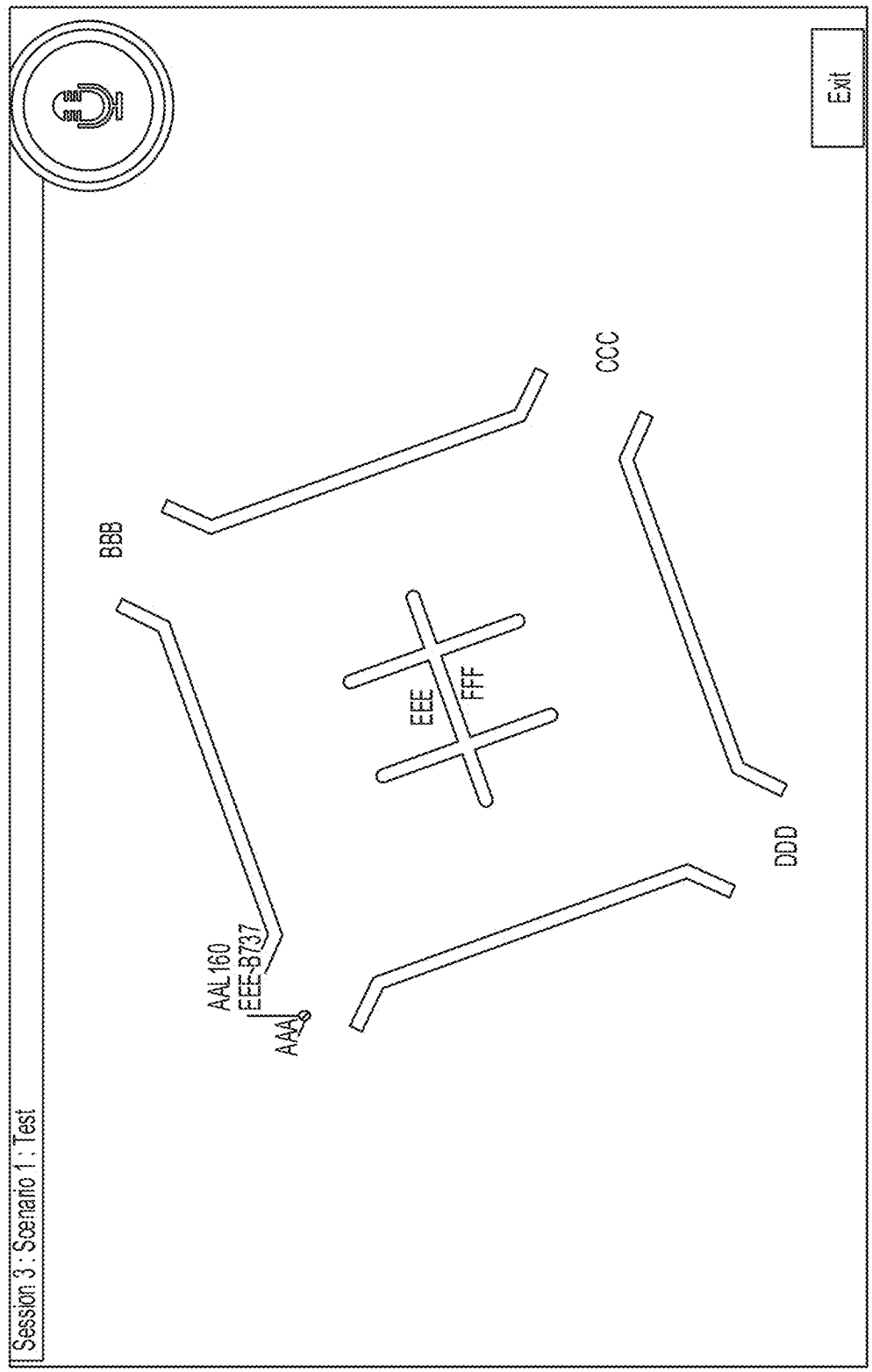
FIG. 4B depicts an exemplary user interface of an electronic device, in accordance with some embodiments.

The second test in Section 3 is a Scenario Test 108b. This test resembles a terminal scenario in that the aircraft enter different gates and are given vectors to ultimately line up for a final approach to the destination gate. There is a noticeably tighter tolerance for vectoring. There are a total of 10 aircrafts and the student controls as many as 4 aircraft at one time. All of the vectoring KSAOs will be assessed. FIG. 4B depicts an exemplary user interface for the Scenario Test 108b. In some embodiments, the test includes 10 aircraft total, with tighter tolerance and fewer vectors. Flights enter different gates: AAA, BBB, CCC, DDD and exit gates EEE or FFF. The student is required to line up on final (e.g., within 25 minutes). Scenario Test 108b tests a student's ability to handle multiple flows of traffic from all directions and line them up in a common direction, using a tight space. The shape can also be rotated from the cardinal headings so that students could not easily rely on "easy" headings (i.e. 90, 180, 270, 360).

Figure 4C:
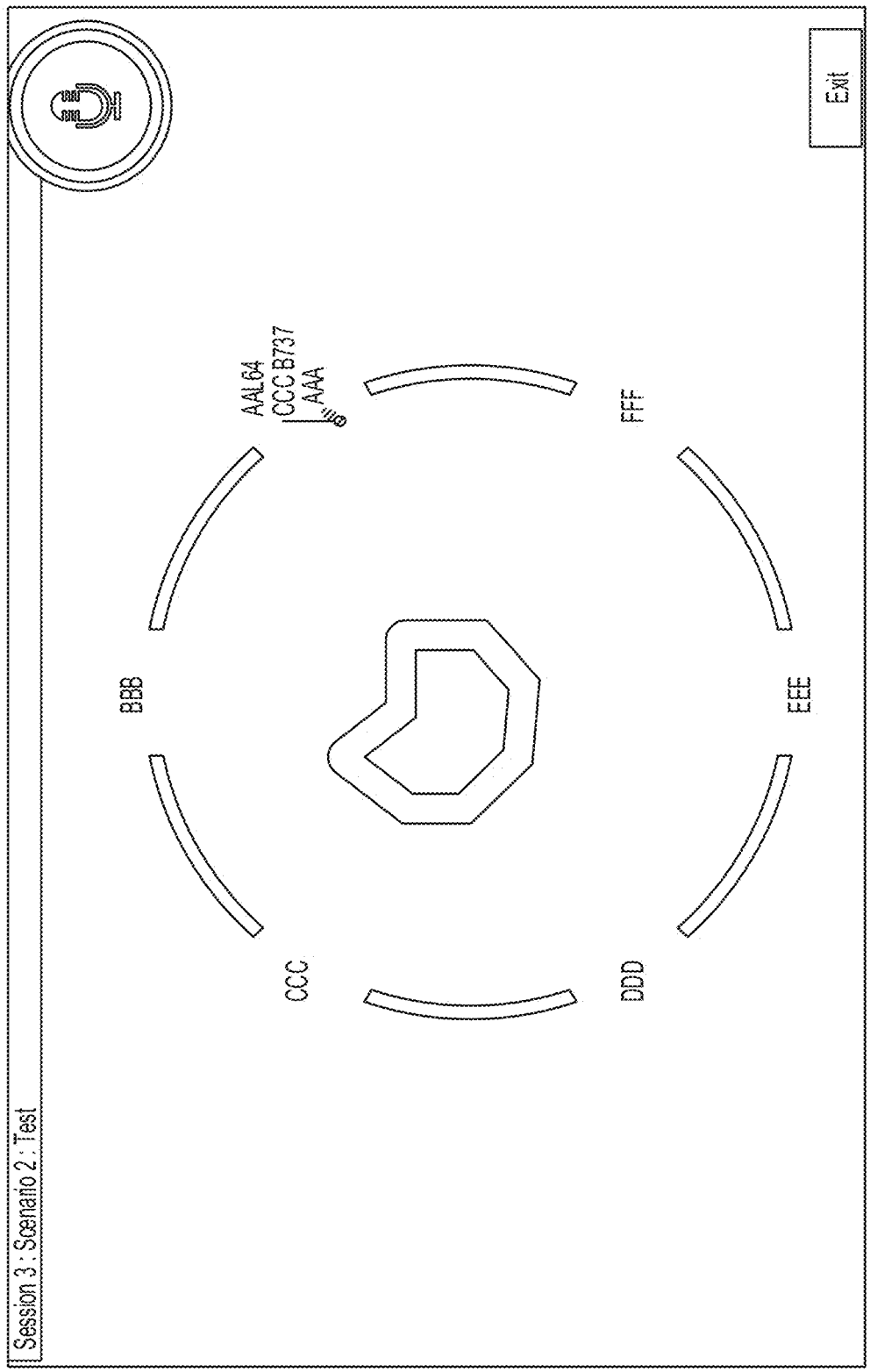
FIG. 4C depicts an exemplary user interface of an electronic device, in accordance with some embodiments.

The final test in Section 3 is also a Scenario Test 108c. FIG. 4C depicts an exemplary user interface for the Scenario Test 108c. This is similar to an en route scenario, which requires vectoring aircrafts in a larger space. Flights enter gates AAA, BBB, CCC, DDD, EEE, FFF and exit different gates. Additionally, there is an area in the center of the shape to avoid. This is intended to correlate to a weather, traffic or special use area in en route airspace. There are a total of 12 aircraft and a student manages 5 aircraft at one time. Similar to the first Scenario Test 108b, students will be assessed on all of the KSAOs necessary for efficient radar vectoring.

The Scenario Test 108c ("En route Scenario") is designed to reflect en route airspace with more flows of traffic and greater space with which to work. An obstacle was placed in the middle of the shape so that aircraft can't fly directly through the space but must be vectored several times. This also adds a level of realism by simulating an airspace restriction, such as weather. Because aircraft have many more origin-destination pairs, students that have a strategy or plan for managing the scenario perform better.

Exemplary User Interfaces of Section 4

Section 4 includes computer-implemented tests directed to facility specific scenarios, with higher workload. The purpose of the higher workload facility-specific scenarios is presenting graphical and auditory user interfaces for evaluating the student's ability to vector aircraft in specific facility types while handling additional challenges.

Section 4 includes the following tests: Scenario 3 Test 110a and Scenario 4 Test 110b. Section 4 continues assessing a student's vectoring skills as well as situation awareness, adaptability, prioritization, confidence and scanning, all with an increased workload. There are two Scenario tests, which will aid in determining a student's ability to vector in a terminal and en route environment.

The first test in Section 4 is a Scenario Test 110a. This is similar to the en route scenario in Section 3, however the two obstacles to avoid are moving. This is also a realistic constraint as air space conflicts (like weather systems or crossing traffic) move. To handle this, students are required to demonstrate further estimating and planning ability to determine efficient, safe paths for aircraft. The student's ability to prioritize, scan, plan, manage a higher workload and adapt to a changing situation will be particularly important in order to successfully guide the aircraft to the correct destination gate.

Figure 5A:
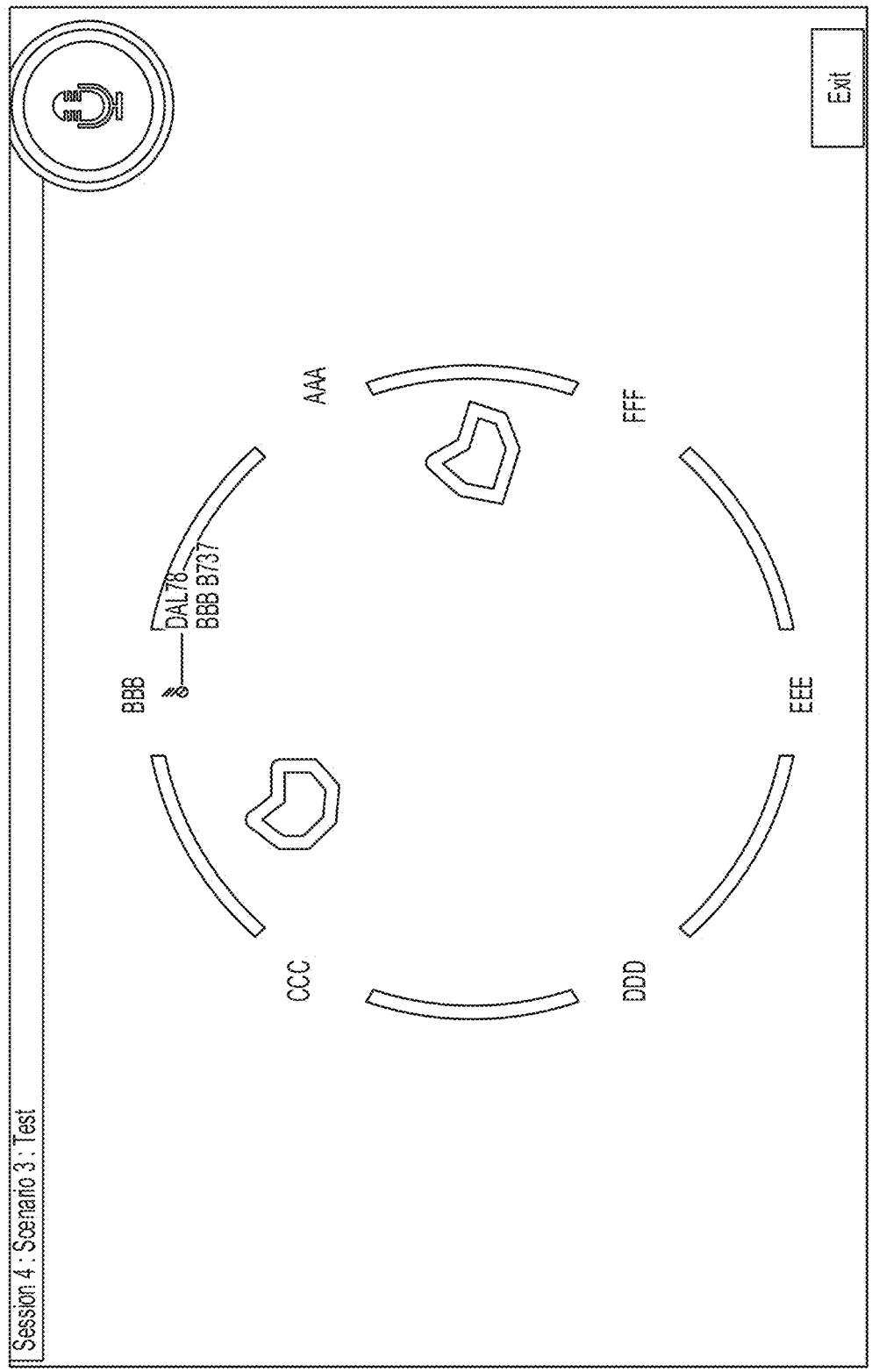
FIG. 5A depicts an exemplary user interface of an electronic device, in accordance with some embodiments.

There are a total of 12 aircraft and a student will manage as many as 6 aircraft at one time. Students will be assessed on all of the KSAOs necessary for efficient radar vectoring. FIG. 5A depicts an exemplary user interface for the Scenario Test 110*a*.

Figure 5B:
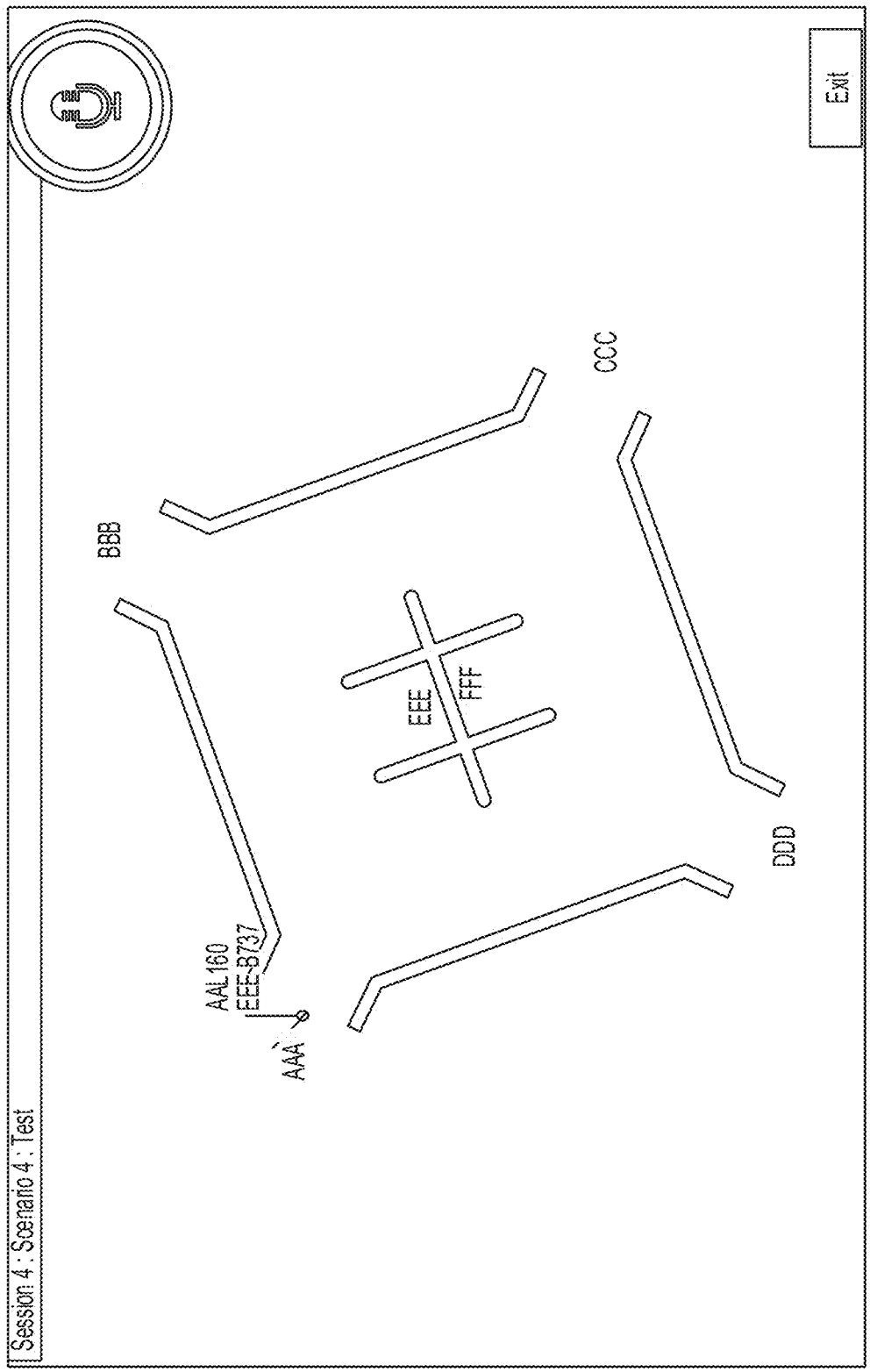
FIG. 5B depicts an exemplary user interface of an electronic device, in accordance with some embodiments.

The second test in Section 4 is a Scenario Test 110*b* that resembles the terminal scenario test in Section 3. FIG. 5B depicts an exemplary user interface for the Scenario Test 110*b*. The aircraft enter different gates and are maneuvered to ultimately line up for a final approach to the destination gate. However, during the scenario the destination gate will change for some of the aircraft. This mimics real operations since terminal areas often switch flows based on local wind patterns. This requires the student to have a greater situation awareness, adapt and change plans mid-stream, and be able to prioritize as they manage a higher workload. There are a total of 12 aircraft and the student controls as many as 5 aircraft at one time. All of the vectoring KSAOs that are necessary for effective radar vectoring will be assessed.

Data Collection and Performance Metrics

In some embodiments, the following data will be collected and analyzed in order to measure the student's performance: Per student/per section, the system will track/log:

Time student logs on (start of section)
Time student logs off (end of section)
Time student begins each test
Time student ends each test
Time student starts trial/shape
Time student completes trial/shape
Vector clearance issued
For each aircraft, time vector clearance issued
For each aircraft, time aircraft is introduced
For each aircraft, trajectory (location of aircraft when clearance issued)
For each aircraft, time aircraft exit gate or hit boundary
Countdown clock time when vector given
Occurrence if countdown clock goes to zero
Occurrence of system response: "Say again" (system doesn't recognize student's speech)
Occurrence of system response: "Please repeat the correct vector clearance"(for practice test student did not repeat what was on the screen)
Speech recognition results (System heard/system response—text and confidence score)
Time system pauses
Where (page/trial) student pauses
Time student selects Continue/Next.
The audio track of clearances issued.

For Basic and Advanced Compass tests, at least the following data is collected:
Number of correct/incorrect vector clearances
Number of correct/incorrect clearances issued when aircraft not centered
Number of incorrect clearances due to improper phraseology
Number of times the countdown clock reaches zero For Shapes and Scenario Tests, at least the following data is collected:

Number of correct/incorrect exit gates
Number of vectors issued to each aircraft
Number of correct clearances
For each shape, average number of vectors issued to each aircraft
Number of aircraft that hit boundary
Time between successive aircraft hitting boundary
Repeated successive vectors to same aircraft with little time in between
Different successive vectors to same aircraft
Time between issuing vectors to different aircraft
Number of audio files
Duration of audio files
Time vector issued
Time aircraft hit the boundary
Time aircraft reached destination gate
Time to complete test
Track for each aircraft The data listed above is analyzed to assess student performance. FIGS. 6A-D provide tables listing the KSAOs that are assessed, the assessment criteria/performance metrics, what specific data will be used in the assessment, how the assessment will be determined and which section of the aptitude test the data provides the data. FIG. 6E includes exemplary variables in the model for predicting the student's aptitude.

Figure 7:
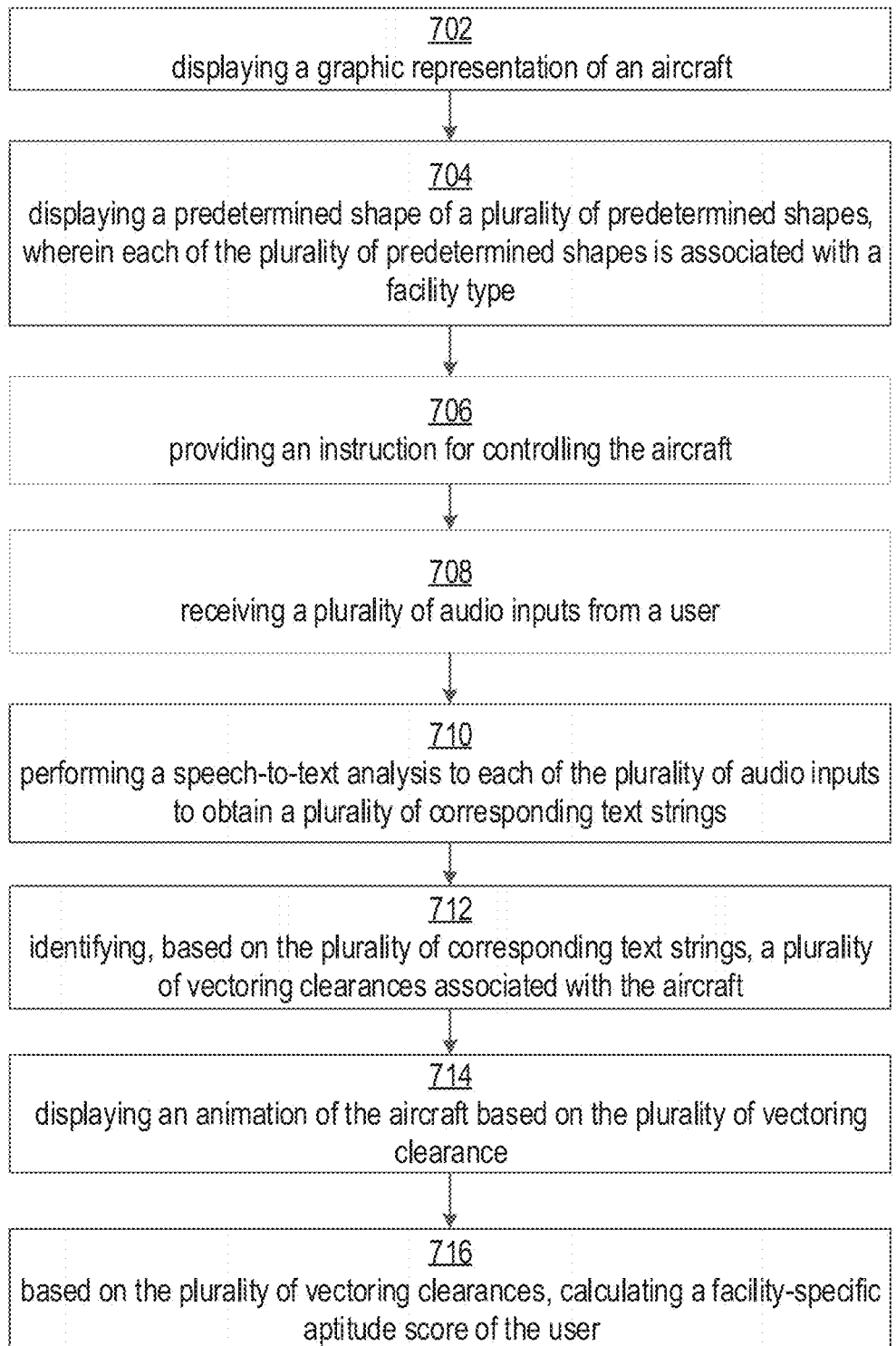
FIG. 7 depicts an exemplary process for evaluating radar vectoring aptitude of an individual, in accordance with some embodiments.

FIG. 7 illustrates process 700 for providing a system, including graphical and auditory user interfaces, for evaluating radar vectoring aptitude, according to various examples. Process 700 is performed, for example, using one or more electronic devices implementing a software platform. In some examples, process 700 is performed using a client-server system, and the blocks of process 700 are divided up in any manner between the server and a client device. In other examples, the blocks of process 700 are divided up between the server and multiple client devices. Thus, while portions of process 700 are described herein as being performed by particular devices of a client-server system, it will be appreciated that process 700 is not so limited. In other examples, process 700 is performed using only a client device (e.g., user device 800) or only multiple client devices. In process 700, some blocks are, optionally, combined, the order of some blocks is, optionally, changed, and some blocks are, optionally, omitted. In some examples, additional steps may be performed in combination with the process 700. Accordingly, the operations as illustrated (and described in greater detail below) are exemplary by nature and, as such, should not be viewed as limiting.

At block 702, an exemplary electronic device displays a graphic representation of an aircraft. At block 704, the device displays a predetermined shape of a plurality of predetermined shapes, wherein each of the plurality of predetermined shapes is associated with a facility type. At block 706, the device provides an instruction for controlling the aircraft. At block 708, the device receives a plurality of audio inputs from a user. At block 710, the device performs a speech-to-text analysis to each of the plurality of audio inputs to obtain a plurality of corresponding text strings. At block 712, the device identifies, based on the plurality of corresponding text strings, a plurality of vectoring clearances associated with the aircraft. At block 714, the device displays an animation of the aircraft based on the plurality of vectoring clearances. In some embodiments, the system animates the aircraft by simulating both aircraft performance and a basic radar screen. For example, the aircraft symbols on the screen are updated approximately every 4.5 seconds, which is roughly the update rate of some radar systems. The aircraft symbol leaves a trail on the screen of their last 5 positions to indicate the direction of travel. In some embodiments, the simulation is carried out using a basic physics model of flight—the aircraft is in level, unaccelerated flight (other than the turn), and a nominal 20 degree bank angle and 250 knot speed is assumed. At block 716, the device calculates, based on the plurality of vectoring clearances, a facility-specific aptitude score of the user.

The operations described above with reference to FIG. 7 are optionally implemented by components depicted in FIG. 8. It would be clear to a person having ordinary skill in the art how other processes are implemented based on the components depicted in FIGS. 1-6 and 8.

FIG. 8 illustrates an example of a computing device in accordance with one embodiment. Device 800 can be a host computer connected to a network. Device 800 can be a client computer or a server. As shown in FIG. 8, device 800 can be any suitable type of microprocessor-based device, such as a personal computer, workstation, server or handheld computing device (portable electronic device) such as a phone or tablet. The device can include, for example, one or more of processor 810, input device 820, output device 830, storage 840, and communication device 860. Input device 820 and output device 830 can generally correspond to those described above, and can either be connectable or integrated with the computer.

Input device 820 can be any suitable device that provides input, such as a touch screen, keyboard or keypad, mouse, or voice-recognition device. Output device 830 can be any suitable device that provides output, such as a touch screen, haptics device, or speaker.

Storage 840 can be any suitable device that provides storage, such as an electrical, magnetic or optical memory including a RAM, cache, hard drive, or removable storage disk. Communication device 860 can include any suitable device capable of transmitting and receiving signals over a network, such as a network interface chip or device. The components of the computer can be connected in any suitable manner, such as via a physical bus or wirelessly.

Software 850, which can be stored in storage 840 and executed by processor 810, can include, for example, the programming that embodies the functionality of the present disclosure (e.g., as embodied in the devices as described above).

Software 850 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 850 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A computer-implemented method, the method comprising:
   at an electronic device comprising a display, a microphone, one or more processors, a memory, and one or more computer programs stored in the memory and configured to be executed by the one or more processors:
   generating a sequence of tests, wherein each test is associated with a ground-based facility type, and wherein generating each test comprises:
   (a) generating, with the display of the electronic device, a graphic representation of an aircraft for display;
   (b) rendering, based on the ground-based facility type associated with the respective test, with the display of the electronic device, a predetermined shape comprising one or more boundaries for the aircraft to avoid while moving to a target destination within the one or more boundaries, wherein the predetermined shape is one of a plurality of predetermined shapes, and wherein each of the plurality of predetermined shapes is associated with the ground-based facility type;
   (c) providing, with the display of the electronic device, an instruction for controlling the aircraft;
   (d) receiving, with the microphone of the electronic device, an audio input from a user indicative of a label for the aircraft, an action for the aircraft to perform, a direction at which to perform the action, a degree to which the action is performed in the direction, or any combination thereof;

(e) performing, by the one or more processors, a speech-to-text analysis to the audio input to obtain a corresponding text string and a speech recognition confidence score associated with the corresponding text string, wherein the speech recognition confidence score indicates confidence of the electronic device in recognizing the audio input;

(f) performing, by the one or more processors, semantic parsing of the corresponding text string to identify vectoring clearance associated with the corresponding text string;

(g) determining, by the one or more processors, a new location of the aircraft based on the vectoring clearance;

(h) generating, with the display of the electronic device, an animation of the aircraft moving to the new location according to the vectoring clearance for display; and (i) repeating steps (d)-(h) until a termination condition is reached, wherein the termination condition comprises the aircraft making contact with the one or more boundaries of the predetermined shape or the aircraft arriving at the target destination in the one or more boundaries;

collecting, for each test of the sequence of tests, by the one or more processors, a plurality of metrics based at least partially on step (i), wherein the plurality of metrics comprises a plurality of time metrics associated with one or more audio inputs received from the user, a quantity of vectoring clearances received from the user, one or more results of the aircraft from issuing one or more vectoring clearances, and the speech recognition confidence score; and calculating, by the one or more processors, a plurality of facility-specific aptitude scores of the user based on the plurality of metrics collected for each test of the sequence of tests, wherein each facility-specific aptitude score is associated with an evaluation of a phraseology and a confidence of the user providing the audio input, and wherein each facility-specific aptitude score is based at least partially on the speech recognition confidence score.

2. The method according to claim 1, wherein the ground-based facility type includes: a tower facility, a terminal radar approach control facility, or an en route facility.

3. The method according to claim 1, wherein the predetermined shape includes one or more obstacles, one or more destinations comprising the target destination, or a combination thereof.

4. The method of claim 3, further comprising: terminating the display of the animation after showing the aircraft contacting an obstacle of the one or more obstacles.

5. The method of claim 4, further comprising: identifying the vectoring clearance as incorrect.

6. The method of claim 1, wherein the instruction is a first instruction indicative of a first destination, the method further comprising: after providing the first instruction, providing a second instruction indicative of a second destination different from the first destination.

7. The method of claim 1, wherein the instruction is indicative of a desired formation of a plurality of aircrafts.

8. The method according to claim 1, wherein the vectoring clearance is a first vectoring clearance, and wherein displaying the animation of the aircraft comprises:

while displaying the animation based on the first vectoring clearance, receiving a second audio input indicative of a second vectoring clearance; and in response to receiving the second audio input indicative of the second vectoring clearance, updating the animation based on the second vectoring clearance.

9. The method of claim 1, further comprising: terminating the display of the animation after showing the aircraft contacting a boundary of the one or more boundaries.

10. The method of claim 9, further comprising: identifying the vectoring clearance as incorrect.

11. The method of claim 1, further comprising: terminating the display of the animation after showing the aircraft reaching the target destination, wherein the target destination is indicated in the instruction.

12. The method of claim 11, further comprising: identifying the vectoring clearance as correct.

13. The method of claim 1, wherein the aircraft is a first aircraft, the method further comprising:

simultaneously displaying the first aircraft and a second aircraft; and in response to receiving a second audio input, determining whether the second audio input is directed to the first aircraft and the second aircraft.

14. The method of claim 1, further comprising: displaying a countdown timer.

15. The method of claim 1, wherein the plurality of metrics comprises:

a time interval between two audio inputs of the plurality of audio inputs;

a time at which the aircraft is displayed;

a time at which the aircraft reaches a destination or contacts a boundary;

an audio recording of the plurality of audio inputs;

the plurality of speech recognition confidence score associated with the corresponding text string;

a total number of vectoring clearances associated with the aircraft;

a number of aircrafts simultaneously displayed with the aircraft;

or any combination thereof.

16. An electronic device, comprising:

a display;

a microphone;

one or more processors;

a memory; and one or more programs, wherein the one or more programs are stored in the memory and configured to be executed by the one or more processors, the one or more programs including instructions for:

generating a sequence of tests, wherein each test is associated with a ground-based facility type, and wherein generating each test comprises:

(a) generating, with the display of the electronic device, a graphic representation of an aircraft for display;

(b) rendering, based on the ground-based facility type associated with the respective test, with the display of the electronic device, a predetermined shape comprising one or more boundaries for the aircraft to avoid while moving to a target destination within the one or more boundaries, wherein the predetermined shape is one of a plurality of predetermined shapes, and wherein each of the plurality of predetermined shapes is associated with the ground-based facility type;

(c) providing, with the display of the electronic device, an instruction for controlling the aircraft;

(d) receiving, with the microphone of the electronic device, an audio input from a user indicative of a label for the aircraft, an action for the aircraft to perform, a direction at which to perform the action, a degree to which the action is performed in the direction, or any combination thereof;

(e) performing, by the one or more processors, a speech-to-text analysis to the audio input to obtain a corresponding text string and a speech recognition confidence score associated with the corresponding text string, wherein the speech recognition confidence score indicates confidence of the electronic device in recognizing the audio input;

(f) performing, by the one or more processors, semantic parsing of the corresponding text string to identify vectoring clearance associated with the corresponding text string;

(g) determining, by the one or more processors, a new location of the aircraft based on the vectoring clearance;

(h) generating, with the display of the electronic device, an animation of the aircraft moving to the new location according to the vectoring clearance for display; and (i) repeating steps (d)-(h) until a termination condition is reached, wherein the termination condition comprises the aircraft making contact with the one or more boundaries of the predetermined shape or the aircraft arriving at the target destination in the one or more boundaries;

collecting, for each test of the sequence of tests, by the one or more processors, a plurality of metrics based at least partially on step (i), wherein the plurality of metrics comprises a plurality of time metrics associated with one or more audio inputs received from the user, a quantity of vectoring clearances received from the user, one or more results of the aircraft from issuing one or more vectoring clearances, and the speech recognition confidence score; and calculating, by the one or more processors, a plurality of facility-specific aptitude scores of the user based on the plurality of metrics collected for each test of the sequence of tests. wherein each facility-specific aptitude score is associated with an evaluation of a phraseology and a confidence of the user providing the audio input, and wherein each facility-specific aptitude score is based at least partially on the speech recognition confidence score.

17. A non-transitory computer-readable storage medium storing one or more programs, the one or more programs comprising instructions, which when executed by one or more processors of an electronic device having a display and a microphone, cause the electronic device to:

generating a sequence of tests, wherein each test is associated with a ground-based facility type, and wherein generating each test comprises:

(a) generating, with the display of the electronic device, a graphic representation of an aircraft for display;

(b) rendering, based on the ground-based facility type associated with the respective test, with the display of the electronic device, a predetermined shape comprising one or more boundaries for the aircraft to avoid while moving to a target destination within the one or more boundaries, wherein the predetermined shape is one of a plurality of predetermined shapes, and wherein each of the plurality of predetermined shapes is associated with the ground-based facility type;

(c) providing, with the display of the electronic device, an instruction for controlling the aircraft;

(d) receiving, with the microphone of the electronic device, an audio input from a user indicative of a label for the aircraft, an action for the aircraft to perform, a direction at which to perform the action, a degree to which the action is performed in the direction, or any combination thereof;

(e) performing, by the one or more processors, a speech-to-text analysis to the audio input to obtain a corresponding text string and a speech recognition confidence score associated with the corresponding text string, wherein the speech recognition confidence score indicates confidence of the electronic device in recognizing the audio input;

(f) performing, by the one or more processors, semantic parsing of the corresponding text string to identify vectoring clearance associated with the corresponding text string;

(g) determining, by the one or more processors, a new location of the aircraft based on the vectoring clearance;

(h) generating, with the display of the electronic device, an animation of the aircraft moving to the new location according to the vectoring clearance for display; and (i) repeating steps (d)-(h) until a termination condition is reached, wherein the termination condition comprises the aircraft making contact with the one or more boundaries of the predetermined shape or the aircraft arriving at the target destination in the one or more boundaries;

collecting, for each test of the sequence of tests, by the one or more processors, a plurality of metrics based at least partially on step (i), wherein the plurality of metrics comprises a plurality of time metrics associated with one or more audio inputs received from the user, a quantity of vectoring clearances received from the user, one or more results of the aircraft from issuing one or more vectoring clearances, and the speech recognition confidence score; and calculating, by the one or more processors, a plurality of facility-specific aptitude scores of the user based on the plurality of metrics collected for each test of the sequence of tests, wherein each facility-specific aptitude score is associated with an evaluation of a phraseology and a confidence of the user providing the audio input, and wherein each facility-specific aptitude score is based at least partially on the speech recognition confidence score.

\* \* \* \* \*